United States Patent [19]
Knipper et al.

[11] Patent Number: 5,741,539
[45] Date of Patent: Apr. 21, 1998

[54] SHELF-STABLE LIQUID EGG

[76] Inventors: Aloysius J. Knipper, 227 Cupsaw Dr., Ringwood, N.J. 07456; Thaddeus J. Polny, Jr., 705 Suburban Rd., Union, N.J. 07083

[21] Appl. No.: 617,140

[22] Filed: Mar. 18, 1996

Related U.S. Application Data

[62] Division of Ser. No. 460,692, Jun. 2, 1995, abandoned.

[51] Int. Cl.$^6$ ........................................... A23L 1/32
[52] U.S. Cl. .......................... 426/614; 426/244; 426/521
[58] Field of Search ................................. 426/614, 239, 426/234, 238, 244, 237, 521

[56] References Cited

U.S. PATENT DOCUMENTS

| | | |
|---|---|---|
| 535,267 | 3/1895 | Wagner et al. . |
| 684,746 | 10/1901 | Chapman . |
| 731,339 | 6/1903 | Chapman . |
| 1,147,558 | 7/1915 | Shelmerdine . |
| 1,360,447 | 11/1920 | Rudd . |
| 1,431,580 | 10/1922 | Graetzer et al. . |
| 1,522,188 | 1/1925 | Hull . |
| 1,775,579 | 9/1930 | Woodrich . |
| 1,813,064 | 7/1931 | Matzka . |
| 1,934,703 | 11/1933 | Golden . |
| 2,081,243 | 5/1937 | Macy . |
| 2,438,582 | 3/1948 | Southerwick . |
| 2,473,041 | 6/1949 | Urbain et al. . |
| 2,495,415 | 1/1950 | Marshall . |
| 2,510,796 | 6/1950 | Brown . |
| 2,550,584 | 4/1951 | Mittelmann . |
| 2,564,579 | 8/1951 | Parmenter et al. . |
| 2,565,311 | 8/1951 | Koonz et al. . |
| 2,582,281 | 1/1952 | Robertson . |
| 2,585,970 | 2/1952 | Shaw . |
| 2,685,833 | 8/1954 | Hagopian . |
| 2,799,216 | 7/1957 | Coulter . |
| 2,838,640 | 6/1958 | Mann et al. . |
| 3,315,681 | 4/1967 | Poppendiek . |

(List continued on next page.)

FOREIGN PATENT DOCUMENTS

| | | |
|---|---|---|
| 2100618 | 1/1994 | Canada . |
| 0 032 840 | 7/1981 | European Pat. Off. . |
| 0 457 179 | 11/1981 | European Pat. Off. . |
| 230-978-A | 1/1986 | European Pat. Off. . |
| 0 497 099 | 8/1992 | European Pat. Off. . |
| 0 685 987 | 12/1995 | European Pat. Off. . |

(List continued on next page.)

OTHER PUBLICATIONS

Database FSTA. An: 94(02):Q0019. Author: Alkskog. from Livsmedelsteknik (1993) 35 (11) pp. 34 and 35.

Alkskog, L., "New Opportunities for Liquid Egg Products" (translated), *Livsmedelsteknik*, (1993) 35 (11), pp. 34–35.

(List continued on next page.)

*Primary Examiner*—Anthony J. Weier
*Attorney, Agent, or Firm*—Fish & Neave; Jeffrey H. Ingerman; Brett G. Alten

[57] ABSTRACT

Methods of and apparatus for producing shelf-stable liquid egg are provided. In particular, methods of and apparatus for producing liquid egg having a shelf life of at least 5 days when stored at about 70° F. (about 21° C.) are provided. In a first preferred embodiment, the liquid egg is electroheated from a temperature of about 110° F. (about 43° C.) to a temperature of at least about 140° F. (about 60° C.) by applying high frequency alternating electric current. The liquid egg is then cooled and again electroheated. In a second preferred embodiment, the liquid egg is electroheated from a temperature of about 110° F. (about 43° C.) to a temperature of at least about 140° F. (about 60° C.) by applying high frequency alternating electric current. The liquid egg is then cooled. A plurality of high voltage electric pulses are then applied to the liquid egg. In a third preferred embodiment, the liquid egg is electroheated from a temperature of about 110° F. (about 43° C.) to a temperature of at least about 140° F. (about 60° C.) by applying mains frequency alternating electric current. The liquid egg is then cooled. A plurality of high voltage electric pulses are then applied to the liquid egg.

3 Claims, 10 Drawing Sheets

U.S. PATENT DOCUMENTS

| | | |
|---|---|---|
| 3,625,843 | 12/1971 | Doevenspeck . |
| 3,632,962 | 1/1972 | Cherniak . |
| 3,709,802 | 1/1973 | Okuhara et al. . |
| 3,753,886 | 8/1973 | Myers . |
| 3,796,857 | 3/1974 | Henley et al. . |
| 3,855,531 | 12/1974 | Fielibert et al. . |
| 3,867,610 | 2/1975 | Quaintance . |
| 3,877,360 | 4/1975 | Vigerstrom . |
| 3,919,052 | 11/1975 | Fresnel et al. . |
| 3,949,099 | 4/1976 | Kaufman . |
| 4,091,119 | 5/1978 | Bach . |
| 4,109,566 | 8/1978 | Vigerstrom . |
| 4,177,719 | 12/1979 | Balaguer . |
| 4,211,887 | 7/1980 | Williamson ............................ 13/6 |
| 4,260,874 | 4/1981 | Will . |
| 4,369,351 | 1/1983 | Massey et al. ..................... 219/284 |
| 4,386,110 | 5/1983 | Komeyasu et al. . |
| 4,417,132 | 11/1983 | Simpson . |
| 4,420,382 | 12/1983 | Riedl . |
| 4,434,357 | 2/1984 | Simpson et al. . |
| 4,457,221 | 7/1984 | Geren . |
| 4,496,594 | 1/1985 | Miyahara . |
| 4,522,834 | 6/1985 | Miyahara . |
| 4,524,079 | 6/1985 | Hofmann . |
| 4,695,472 | 9/1987 | Dunn et al. . |
| 4,723,483 | 2/1988 | Papchenko et al. . |
| 4,739,140 | 4/1988 | Reznik . |
| 4,808,425 | 2/1989 | Swartzel et al. . |
| 4,838,154 | 6/1989 | Dunn et al. . |
| 4,853,238 | 8/1989 | Huang . |
| 4,857,343 | 8/1989 | Hekal . |
| 4,871,559 | 10/1989 | Dunn et al. . |
| 4,957,759 | 9/1990 | Swartzel et al. . |
| 4,957,760 | 9/1990 | Swartzel et al. . |
| 4,959,525 | 9/1990 | Stirling et al. . |
| 4,971,819 | 11/1990 | Miyahara . |
| 4,971,827 | 11/1990 | Huang . |
| 4,994,291 | 2/1991 | Swartzel et al. . |
| 5,019,407 | 5/1991 | Swartzel et al. . |
| 5,019,408 | 5/1991 | Swartzel et al. . |
| 5,048,404 | 9/1991 | Bushnell et al. . |
| 5,084,153 | 1/1992 | Mosse et al. . |
| 5,091,152 | 2/1992 | Thomas, Sr. . |
| 5,105,724 | 4/1992 | Swartzel et al. . |
| 5,167,976 | 12/1992 | Papetti . |
| 5,226,106 | 7/1993 | Stirling . |
| 5,235,905 | 8/1993 | Bushnell et al. . |
| 5,288,471 | 2/1994 | Corner . |
| 5,290,583 | 3/1994 | Reznik et al. . |
| 5,326,530 | 7/1994 | Bridges . |
| 5,415,882 | 5/1995 | Knipper et al. ..................... 426/237 |
| 5,514,391 | 5/1996 | Bushnell et al. ..................... 426/237 |

FOREIGN PATENT DOCUMENTS

| | | |
|---|---|---|
| 2513087 | 3/1983 | France . |
| 945 582 | 7/1956 | Germany . |
| 1 075 570 | 11/1957 | Germany . |
| 47-48542 | 6/1972 | Japan . |
| 24735 | 2/1931 | Netherlands . |
| 639158 | 12/1978 | U.S.S.R. . |
| 683034 | 8/1979 | U.S.S.R. . |
| 895141 | 5/1962 | United Kingdom . |
| 904371 | 8/1962 | United Kingdom . |
| 2068200 | 8/1981 | United Kingdom . |
| 2140668 | 12/1984 | United Kingdom . |
| 2 147 776 | 5/1985 | United Kingdom . |
| 2 164 732 | 3/1986 | United Kingdom . |
| 2 282 052 | 3/1995 | United Kingdom . |
| WO 8900384 | 1/1989 | WIPO . |
| WO 9015547 | 12/1990 | WIPO . |
| WO 93/04421 | 3/1993 | WIPO . |
| WO 9319620 | 10/1993 | WIPO . |
| WO 94/11681 | 5/1994 | WIPO . |
| WO 94/18845 | 9/1994 | WIPO . |
| WO 95/10943 | 4/1995 | WIPO . |

OTHER PUBLICATIONS

Alkskog, L., "High Temperature Pasteurization of Liquid Whole Egg," Process Technology, pp. 16–18.

"Annual Report of Cooperative Regional Products" Supported by Allotment of the Regional Fund, Hatch Act, as Amended Aug. 11, 1955, Jan. 1 to Dec. 31, 1984, Raleigh, North Carolina. Approved by Chairman Hershell Ball, Jr. on Mar. 14, 1985.

Ball, H.R. Jr. et al., "Function and Shelf Life of Ultrapasteurized, Aseptically Packaged Whole Egg" Abstract, Poultry Science Association Annual Meeting–Jul. 29–Aug. 2, 1985, Iowa State University, Ames.

Dinnage, D.F., "Continuous Aseptic Processing Using the Ohmic Heating Process," Changing Food Technology 3, Food Technology: A view of the Future (Selected Papers from the Sixth Eastern Food Science & Technology Conference), Edited by Allen Freed (1990), pp. 29–41.

Essary, E.O. et al., "New Uses of Heated Aseptically Packaged Fluid Egg Products," Departments of Food Science and Technology, and Chemical Engineering, Virginia Polytechnic Institute and State University, Blacksburg, VA, 1983.

Hamid–Samimi, M.H., "Criteria Development for Extended Shelf–Life Pasteurized Liquid Whole Egg," Ph.D. Thesis, North Carolina State University, Raleigh, North Carolina, 1984.

Hamid–Samimi, M.H. et al., "Aseptic Packaging of Ultrapasteurized Egg. Design and Economic Considerations," publication date unknown, but a copy was transmitted to Mr. Merle Kirk under cover of a letter dated Aug. 21, 1985 from Prof. Hersell Ball, Jr.

Hanson et al., "Pasteurization Of Liquid Egg Products," Received for publication Nov. 16, 1946 pp. 277–283.

Jacobs, L.C., "Aseptic packaging promises new role for pasteurized liquid eggs," Apr., 1981.

Madsen, M., "Pasteurizing of Egg Products," Sundhedsplejen (Dec., 1958), 102–105 and translation thereof.

Murdock et al., "The Pasteurization Of Liquid Whole Egg," issued from the Office of Medical Research Council, 38, Old Queen Street, Westminster,S.W.I.

Palaniappan, S.,"Ohmic Heating of Foods: Studies on Microbicidal Effect of Electricity, Electrical Conductivity of Foods, and Heat Transfer In," Ph.D. Thesis, The Ohio State University, 1991.

Palaniappan, S. et al., "Effects of Electricity on Microorganisms, A review," Journal of Food Processing and Preservation vol. 14, No. 5 (Oct., 1990), pp. 383–414.

Palaniappan, S. et al., "Experimental Studies on Electroconductive (Ohmic) Heating of Liquids," prepared for an American Society of Agricultural Engineers Meeting presentation (Dec. 12–12–15, 1989), Paper No. 89–6553.

Parrott, D.L. et al., "The Aseptic Processing of Fluids Containing Particulates from 1/8" to 1' size," prepared for presentation at American Institution of Chemical Engineers 1988 Summer Meeting (Aug. 21–24, 1988) (Unpublished), Paper No. 60e.

Parrott, D.L., "Use of Ohmic Heating for Aseptic Processing of Food Particulates," Food Technology (Dec., 1992), pp. 68–72.

Reznik, D., "Electroheating," Dec., 1989.

Russell, M.J., "Live Long and Prosper," Food Engineering, Dec., 1992, pp. 77–80.

Sastry, S.K., "A Model for Heating of Liquid–Particle Mixtures in a Continuous Flow Ohmic Heater," Journal of Food Process Engineering 15 (1992), pp. 263–278.

Sastry, S.K., "Mathematical Modeling and Experimental Studies on Ohmic Heating of Liquid–Particle Mixtures in a Static Heater," Journal of Food Process Engineering 15 (1992), pp. 241–261.

Sastry, S.K. et al., "Ohmic Heating of Liquid–Particle Mixtures," Food Technology (Dec., 1992), pp. 64–67.

Sill, M., "NCSU researchers crack the secret of long shelflife for eggs," *The News and Observer*, Raleigh, North Carolina, Sep. 3, 1985.

Stone, W.K. et al., "Aseptic Processing of Liquid Eggs Pasteurized in a Teflon Heat Exchanger," 1983.

Winter et al., "Pasteurization of Liquid–Egg Products I. Bacteria Reduction in Liquid Whole Egg and Improvement in Keeping Quality," Journal Paper No. J–1300 of the Town Agricultural Experimental Station, received for publication on Jun. 18, 1945, 229–245.

Winter et al., "Pasteurization of Liquid Egg Products III. Destruction of Salmonella in Liquid Whole Egg," American Journal of Public Health, vol. 36, pp. 451–460 (1946).

SHELF-STABLE LIQUID EGG

CROSS REFERENCE TO RELATED APPLICATIONS

This is a division of United States patent application Ser. No. 08/460,692, filed Jun. 2, 1995 now abandoned.

BACKGROUND OF THE INVENTION

The present invention relates to methods of and apparatus for producing shelf-stable liquid egg. More particularly, the present invention relates to methods of and apparatus for producing liquid egg having a shelf life of at least 5 days when stored at about 70° F. (about 21° C.).

Previously known liquid egg products usually require refrigeration at a temperature of about 40° F. (about 4° C.) or lower. Providing refrigeration equipment is a significant cost in the storage, transport, and sale of previously known liquid egg products.

In order to display previously known liquid egg products to consumers, refrigerated display cases must be used. In addition to the cost required to provide refrigerated display cases, such display cases may not properly refrigerate all liquid egg products. Liquid egg products which are displayed "in front" are often exposed to ambient temperatures of about 70° F. (about 21° C.). Exposure to ambient temperatures accelerates the spoilage process and thus shortens the shelf life of the product. This problem is compounded by the common practice of displaying the oldest liquid egg products in front in order to sell them before their expiration date.

Numerous techniques have been developed in order to attempt to extend the shelf life of liquid egg products. Although some of the techniques have been successful at extending the refrigerated shelf life of liquid egg, a liquid egg product which is shelf-stable at ambient temperatures has not been described. Previous liquid egg products therefore may spoil if exposed to ambient temperatures.

U.S. Pat. No. 5,290,583 of David Reznik and Aloysius Knipper ("the '583 patent") discloses a method of pasteurizing liquid egg in which an AC electric current is passed through the liquid egg. The current density passed through the liquid egg is preferably less than about 6 amps/cm$^2$, and of a frequency preferably between about 100 Hz and about 450 kHz. This method provides liquid egg having a refrigerated shelf life of at least 4 weeks. The '583 patent also discloses that liquid egg treated according to the methods described therein, and stored at 70° F. (21° C.) for three days, retains the color, viscosity, and odor of eggs treated and then stored at 38° F. (3° C.). The '583 patent thus discloses methods of treating liquid egg which are a significant improvement in the art of liquid egg pasteurization techniques. However, the '583 patent does not disclose a liquid egg product having a shelf life of more than 3 days when stored at 70° F. (21° C.).

U.S. Pat. No. 4,695,472 ("the '472 patent") discusses methods of and apparatus for extending the refrigerated shelf life of fluid food products including liquid egg. The methods and apparatus of the '472 patent involve the repeated application of high voltage, high current density, discrete electric pulses to fluid food products. Electric field strengths in the range of 5,000 V/cm to about 37,000 V/cm are discussed in the '472 patent. The current densities used are at least 2 amps/cm$^2$ and more preferably, at least 5 amps/cm$^2$. The electric field and current are applied to the food product in pulses having a duration of between 5 microseconds and 100 microseconds.

The '472 patent describes treating liquid egg in a static test apparatus, and does not describe treating liquid egg under continuous processing conditions. Such statically treated liquid egg is found to have a longer refrigerated shelf life when stored at 4° C. and 10° C. than untreated liquid egg stored at the same temperatures. However, the '472 patent does not describe the properties of the treated liquid egg. Moreover, the '472 patent does not discuss liquid egg which is treated and stored at non-refrigerated temperatures.

U.S. Pat. No. 5,019,408 (the "'408 patent") describes a so-called "ultrapasteurization" process. The '408 patent states that some samples of ultrapasteurized liquid whole egg stored at 4° C. maintain the chemical, functional, and organoleptic properties of processed egg for up to 24 weeks. The '408 patent, however, does not discuss the stability of ultrapasteurized liquid egg at non-refrigerated temperatures.

PCT International Publication Number WO94/18845 ("the '845 application") discusses the use of lanthionine bacteriocin to combat Bacillus induced coagulation in liquid whole egg. The '845 application states (page 23, lines 17–24) that coagulation did not occur until day 7 or 8 in reduced cholesterol ultrapasteurized liquid whole egg product treated with nisin at dosages greater than or equal 500 IU/g and stored at 70° F. (21° C.). The '845 application, however, does not describe the properties of the egg product (e.g., color, odor, foaming ability, emulsion properties, viscosity), at any time during the 7 or 8 days. Moreover, the '845 application does not state that the treated egg product is safe to consume. It is thus apparent that the '845 application does not provide an egg product which is shelf-stable at 70° F. (21° C.).

In view of the exposure of liquid egg products to temperatures above 40° F. (about 4° C.), which may occur during display of the products, and further in view of the cost savings which would result if the need for refrigeration could be eliminated, it would be advantageous to provide methods of and apparatus for producing liquid egg which is shelf-stable when stored at ambient temperatures of about 70° F. (about 21° C.).

SUMMARY OF THE INVENTION

It is therefore an object of the present invention to provide methods of and apparatus for producing a liquid egg product which is shelf-stable when stored at ambient temperatures of about 70° F. (about 21° C.).

In particular, it is an object of the present invention to provide methods of and apparatus for producing liquid egg having a shelf life of at least 5 days when stored at about 70° F. (about 21° C.).

The above and other objects of the present invention are accomplished by electroheating liquid egg and then aseptically packaging the liquid egg. In accordance with the present invention, the following steps preferably are carried out in order to produce shelf-stable liquid egg. First, the liquid egg is preheated to a temperature of at least about 110° F. (about 43° C.). The liquid egg is then heated a first time to a temperature of at least about 140° F. (about 60° C.) using a method selected from the group consisting of electroheating the liquid egg using high frequency alternating electric current, electroheating the liquid egg using mains frequency alternating electric current, and applying a plurality of high voltage electric pulses to the liquid egg. The liquid egg is then cooled to a temperature below about 140° F. (about 60° C.). The liquid egg is then heated a second time to a temperature of at least about 140° F. (about 60° C.), using a method selected from the group consisting of electroheating the liquid egg using high frequency alternating electric current, electroheating the liquid egg using mains frequency alternating electric current, and applying a plurality of high voltage electric pulses to the liquid egg. The liquid egg is then held for a predetermined period of time, and then aseptically packaged. Liquid egg produced in accordance with this method is shelf-stable. The liquid egg has a shelf life of at least 5 days when stored at about 70° F. (about 21°).

In a preferred embodiment, the first heating step comprises electroheating the liquid egg using high frequency alternating electric current having a frequency between about 100 kHz and about 450 kHz.

In another preferred embodiment, the first heating step comprises electroheating the liquid egg using mains frequency alternating electric current having a frequency between about 50 Hz and about 90 Hz.

In still another preferred embodiment, the first heating step comprises applying between about 5 and about 7 high voltage electric pulses to the liquid egg.

In a preferred embodiment, the second heating step comprises electroheating the liquid egg using high frequency alternating electric current having a frequency between about 100 kHz and about 450 kHz.

In another preferred embodiment, the second heating step comprises electroheating the liquid egg using mains frequency alternating electric current having a frequency between about 50 Hz and about 90 Hz.

In still another preferred embodiment, the second heating step comprises applying between about 5 and about 7 high voltage electric pulses to the liquid egg.

In a preferred embodiment, the liquid egg is cooled to a temperature below about 140° F. (about 60° C.) after the second step of heating the liquid egg. The liquid egg is then heated a third time to a temperature of at least about 140° F. (about 60° C.) using a method selected from the group consisting of electroheating the liquid egg using high frequency alternating electric current, electroheating the liquid egg using mains frequency alternating electric current, and applying a plurality of high voltage electric pulses to the liquid egg.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
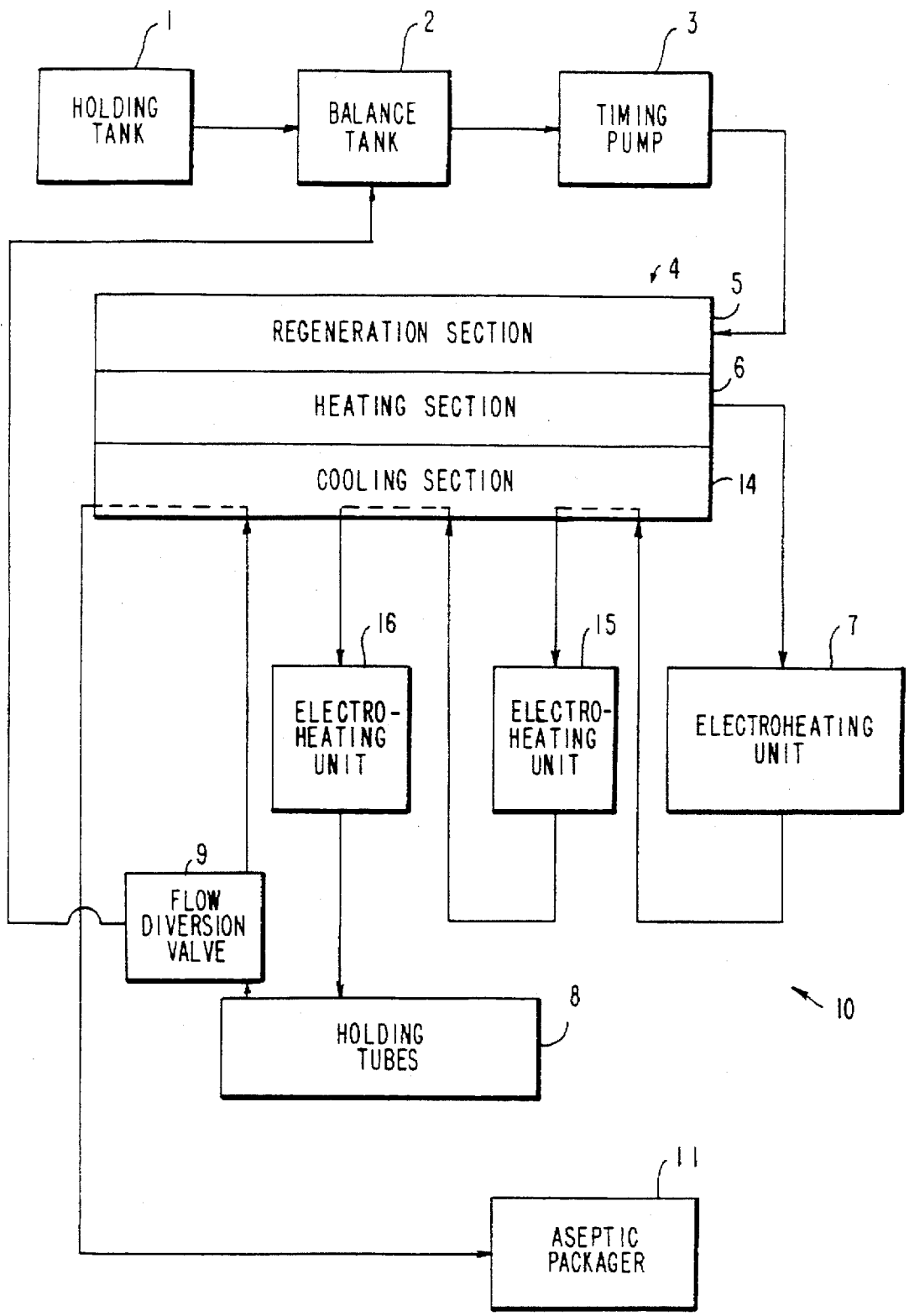
FIG. 1 is a schematic drawing of a first preferred embodiment of an electroheating apparatus for producing shelf-stable liquid egg in accordance with the present invention.

The term "liquid egg" in accordance with the present invention is meant to include not only liquid egg white and liquid egg yolk, but combinations of each in any predetermined or desirable ratio (also referred to as "liquid whole egg"). The term liquid egg also includes liquid egg white, liquid egg yolk, or liquid whole egg with additives such as salt, sugar, milk, stabilizers, dextrins, cyclodextrins, enzymes, antibiotics, peroxides, lanthionine bacteriocins such as nisin, acids such as citric acid, and foodstuffs including solid or particulate foodstuffs. Liquid egg from which cholesterol has been removed is also included. While it is possible in accordance with the present invention to add additives to the liquid egg before or during processing, the addition thereof is not necessary in accordance with the present invention to provide shelf-stable liquid egg.

The term "shelf-stable" in accordance with the present invention means that the liquid egg has a shelf life of at least 5 days when stored at about 70° F. (about 21° C.). Shelf-stable also means that the liquid egg is safe to consume, and substantially retains the usual properties (e.g, foaming ability, pourability, emulsifying properties) of liquid egg for at least 5 days when stored at about 70° F. (about 21° C.). When stored at lower temperatures, shelf-stable liquid egg accordingly has a longer shelf life.

The term "electroheating" in accordance with the present invention is meant to encompass a process of generating heat in liquid egg by passing an electric current through the liquid egg. The liquid egg acts as a resistor and heat is generated thereby.

The term "high frequency" in accordance with the present invention includes frequencies which are high enough to prevent the electrolysis of food products and the dissolution of electrodes. Preferably, high frequency refers to frequencies between about 100 Hz and about 450 kHz. More preferably, high frequency refers to frequencies between about 100 kHz and about 450 kHz and, most preferably, frequencies between about 150 kHz and about 450 kHz.

The term "mains frequency" in accordance with the present invention refers to frequencies between about 30 Hz and about 99 kHz. More preferably, mains frequency refers to frequencies between about 50 Hz and about 10 kHz, and most preferably, frequencies between about 50 Hz and about 90 Hz.

"Electrolysis" is an electrochemical process which can be characterized by at least two specific phenomena. One electrolytic phenomenon results in the dissolution of the metal electrodes inserted into the food being treated. As ions flow between a pair of electrodes, the metal at the surface of the electrodes becomes ionized by releasing electrons to positive ions in the food. The metal ions then dissolve into the food being treated. Another electrolytic phenomenon is caused by the conversion of conductive ionic species within the food being treated to radicals and molecules such as the conversion of hydrogen ion to hydrogen atoms and then to hydrogen gas molecules. Similar processes take place with regard to chlorine, hydroxide ions and the like. These conversions can adversely impact the flavor and other advantageous qualities of the treated food both as the result of direct depletion of the ions and their conversion to other species, and by initiating other reactions within the food such as oxidation and reduction.

"Detrimental coagulation" in accordance with the present invention refers to the coagulation of proteins within the liquid egg such that there are visible particles of egg and/or the loss of functionality. The functional properties of liquid egg, as well as techniques to measure them, are well known to those skilled in the art, and include, for example, foaming ability, pourability, and emulsifying properties.

In a first preferred embodiment of the present invention, the liquid egg is first preheated to a temperature of about 110° F. (about 43° C.). The liquid egg may preferably be preheated, for example, by a plate heat exchanger. The liquid egg then passes through a first electroheating unit. In the first electroheating unit, the liquid egg passes through a plurality of electroheating cells wherein high frequency electric current which is effective to heat the liquid egg substantially without electrolysis is applied to the liquid egg in such a way so as to avoid detrimental coagulation. In a preferred embodiment, liquid egg entering the first electroheating unit from the plate heat exchanger is elevated from a temperature of about 110° F. (about 43° C.) to a temperature between about 140° F. (about 60° C.) and about 145° F. (about 63° C.), and more preferably, to a temperature between greater than about 140° F. (about 60° C.) and about 145° F. (about 63° C.).

The first electroheating unit passes a current preferably having a frequency between about 100 Hz and about 450 kHz through the liquid egg. More preferably, the frequency is between about 100 kHz and about 450 kHz and, most preferably, between about 150 kHz and about 450 kHz. The first electroheating unit preferably utilizes electric fields having a strength of 1000 volts/cm or lower, and more preferably, 500 volts/cm or lower. Similarly, relatively low current densities are used. Preferably, current densities of about 6 amps/cm$^2$ or lower are utilized. More preferably, current densities of about 3 amps/cm$^2$ or lower are used, and most preferably, current densities of about 1 amp/cm$^2$ or lower are used.

After passing through the first electroheating unit, the liquid egg passes through a cooling section of the plate heat exchanger. The liquid egg is preferably cooled to a temperature between about 120° F. (about 49° C.) and about 140° F. (about 60° C.), and more preferably between about 130° F. (about 54° C.) and about 139° F. (about 59° C.). The liquid egg is most preferably cooled to a temperature of about 130° F. (about 54° C.).

The liquid egg then passes through a second electroheating unit, which preferably is similar to the first electroheating unit. The second electroheating unit may, however, have fewer electroheating cells than the first electroheating unit since the temperature increase of the liquid egg in the second electroheating unit is less than the temperature increase of the liquid egg in the first electroheating unit. The liquid egg is preferably heated to a temperature between about 140° F. (about 60° C.) and about 145° F. (about 63° C.). More preferably, the liquid egg is heated to a temperature between greater than about 140° F. (about 60° C.) and about 145° F. (about 63° C.).

After passing through the second electroheating unit, the liquid egg preferably again passes through the cooling section of the plate heat exchanger. The liquid egg is preferably cooled to a temperature between about 120° F. (about 49° C.) and about 140° F. (about 60° C.), and more preferably between about 130° F. (about 54° C.) and about 139° F. (about 59° C.). The liquid egg is most preferably cooled to a temperature of about 130° F. (about 54° C.).

The liquid egg then preferably passes through a third electroheating unit, which preferably is similar to the second electroheating unit. As in the case of the second electroheating unit, the third electroheating unit may have fewer electroheating cells than the first electroheating unit.

In the third electroheating unit, the liquid egg is preferably heated to a temperature between about 140° F. (about 60° C.) and about 145° F. (about 63° C.). More preferably, the liquid egg is heated to a temperature between greater than about 140° F. (about 60° C.) and about 145° F. (about 63° C.).

After passing through the third electroheating unit, the liquid egg then passes through holding tubes, where the liquid egg is held for a predetermined period of time. At liquid egg temperatures ranging between about 140° F. (about 60° C.) and about 145° F. (about 63° C.), the liquid egg is preferably held for at least about 2.5 minutes and, more preferably, between about 3 minutes and about 4 minutes. The holding time may, however, be shorter than 2.5 minutes, or longer than 4 minutes, depending on the bacterial load present in the liquid egg.

After the liquid egg has passed through the holding tubes, it reaches a flow diversion valve. If the temperature of the liquid egg exiting the holding tubes is below a preset value, then it is presumed that the treatment of the liquid egg is not complete and the liquid egg is channeled back to a balance tank through the flow diversion valve. If, however, the temperature of the liquid egg is at or higher than the preset temperature, the liquid egg is allowed to proceed to the cooling section of the plate heat exchanger for cooling. This ensures that the liquid egg has been electroheated to a temperature of at least the preset value. This is true because the temperature of the liquid egg does not significantly change while it is held (i.e., the temperature of the liquid egg after being held is substantially the same as the temperature of the liquid egg after the last electroheating step).

In accordance with the present invention, the preset value preferably is at least about 140° F. (about 60° C.). If, for example, it is desirable to electroheat the liquid egg to 145° F. (about 63° C.), the preset value would also be set to 145° F. (about 63° C.) in order ensure that this temperature is actually attained.

After the liquid egg is held, the cooling section preferably returns the liquid egg to a temperature less than or equal to about 70° F. (about 21° C.). The liquid egg then passes from the cooling section to an aseptic packager wherein the liquid egg is aseptically packaged.

The liquid egg can, however, be aseptically packaged before being cooled. In this case, the liquid egg preferably passes directly from the flow diversion valve to the aseptic packager. After being packaged, the liquid egg preferably is cooled to a temperature less than or equal to about 70° F. (about 21° C.).

Liquid egg produced in accordance with this embodiment is shelf-stable. The liquid egg has a shelf life of at least 5 days when stored at about 70° F. (about 21° C.). More preferably, the liquid egg has a shelf life of at least 7 days when stored at about 70° F. (about 21° C.).

In accordance with a second preferred embodiment of the present invention, the liquid egg is first preheated to a temperature of about 110° F. (about 43° C.). The liquid egg then passes through an electroheating unit which is similar to the first electroheating unit of the first preferred embodiment. The electroheating unit preferably heats the liquid egg to a temperature of between about 140° F. (about 60° C.) and about 145° F. (about 63° C.). More preferably, the electroheating unit heats the liquid egg to a temperature between greater than about 140° F. (about 60° C.) and about 145° F. (about 63° C.).

After passing through the electroheating unit, the liquid egg passes through a cooling section of a plate heat exchanger wherein the liquid egg is preferably cooled to a temperature between about 120° F. (about 49° C.) and about 140° F. (about 60° C.), and more preferably between about 130° F. (about 54° C.) and about 139° F. (about 59° C.). The liquid egg is most preferably cooled to a temperature of about 130° F. (about 54° C.).

In accordance with the second embodiment of the present invention, after being cooled, the liquid egg passes through a first electric pulsing unit, wherein a plurality of high voltage electric pulses are applied to the liquid egg. The high voltage pulses preferably are of a voltage greater than about 5,000 volts and more preferably, of a voltage of about 20,000 volts. The pulses are applied for a duration which preferably ranges from about 1 microsecond to about 500 microseconds. The flow rate of the liquid egg through the first electric pulsing unit and the duration of time between each pulse are calibrated so that the liquid egg is subjected to at least two pulses as it passes through the unit. More preferably, the liquid egg is subjected to between about 5 and about 7 electric pulses as the liquid egg passes through the electric pulsing unit.

The electric pulses heat the liquid egg to a temperature preferably between about 140° F. (about 60° C.) and about 145° F. (about 63° C.). More preferably, the liquid egg is heated to a temperature between greater than about 140° F. (about 60° C.) and about 145° F. (about 63° C.).

After passing through the first electric pulsing unit, the liquid egg preferably again passes through the cooling section of the plate heat exchanger. The liquid egg is again preferably cooled to between about 120° F. (about 49° C.) and about 140° F. (about 60° C.), and more preferably to between about 130° F. (about 54° C.) and about 139° F. (about 59° C.). Most preferably, the liquid egg is cooled to about 130° F. (about 54° C.).

The liquid egg then preferably passes through a second electric pulsing cell, which preferably is similar to the first pulsing unit and preferably operates in a manner similar to the first pulsing unit. The liquid egg is again preferably heated to between about 140° F. (about 60° C.) and about 145° F. (about 63° C.), and more preferably to between greater than about 140° F. (about 60° C.) and about 145° F. (about 63° C.).

After being heated by the second pulsing unit, the liquid egg then passes through holding tubes, where it is held for a predetermined period of time. At processing rates and temperatures ranging between about 140° F. (about 60° C.) and about 145° F. (about 63° C.), liquid egg is preferably held for at least about 2.5 minutes and, more preferably, between about 3 minutes and about 4 minutes. The holding time may, however, be shorter than 2.5 minutes, or longer than 4 minutes, depending on the bacterial load present in the liquid egg.

After the liquid egg has worked its way through the holding tubes, it reaches a flow diversion valve. If the temperature of the liquid egg exiting the holding tubes is below a preset value, then it is presumed that the treatment of the liquid egg is not complete and the liquid egg is channeled back to a balance tank through the flow diversion valve. If, however, the temperature of the liquid egg is at or higher than the preset temperature, the liquid egg is allowed to proceed to the cooling section of the plate heat exchanger for cooling. This ensures that the liquid egg is electroheated to a temperature of at least the preset value. The preset value preferably is about 140° F. (about 60° C.).

The cooling section preferably returns the liquid egg to a temperature less than or equal to about 70° F. (about 21° C.). The liquid egg is then aseptically packaged.

The liquid egg can, however, be aseptically packaged before being cooled. In this case, the liquid egg preferably passes directly from the flow diversion valve to the aseptic packager. After being packaged, the liquid egg preferably is cooled to a temperature less than or equal to about 70° F. (about 21° C.).

Liquid egg treated in accordance with the second preferred embodiment of this invention is shelf-stable. The liquid egg has a shelf life of at least 5 days when stored at about 70° F. (about 21° C.). More preferably, the liquid egg has a shelf life of at least 7 days when stored at 70° F. (about 21° C.).

In a third preferred embodiment of the present invention the liquid egg is again preferably preheated to a temperature of about 110° F. (about 43° C.). In this embodiment, however, after being preheated, the liquid egg passes through a mains frequency electroheating unit. The mains frequency electroheating unit preferably heats the liquid egg from about 110° F. (about 43° C.) to a temperature of between about 140° F. (about 60° C.) and about 145° F. (about 63° C.). More preferably, the mains frequency electroheating unit heats the liquid egg to a temperature of between greater than about 140° F. (about 60° C.) and about 145° F. (about 63° C.).

The mains frequency electroheating unit heats the liquid egg by passing a current having a frequency between about 30 Hz and about 99 kHz through the liquid egg. More preferably, a frequency between about 50 Hz and about 10 kHz is used. Most preferably, a frequency between about 50 Hz and about 90 Hz is used. The voltages used in the mains frequency electroheating unit are preferably between about 50 volts and about 500 volts. The current densities used are preferably lower than about 4 amps/cm$^2$, and more preferably lower than about 1 amp/cm$^2$.

After passing through the mains frequency electroheating unit, the liquid egg passes through a cooling section of a plate heat exchanger wherein the liquid egg is cooled. The liquid egg is preferably cooled to a temperature between about 120° F. (about 49° C.) and about 140° F. (about 60° C.), and more preferably between about 130° F. (about 54° C.) and about 139° F. (about 59° C.). The liquid egg is most preferably cooled to a temperature of about 130° F. (about 54° C.).

After being cooled, the liquid egg passes through a first electric pulsing unit, wherein a plurality of high voltage electric pulses are applied to the liquid egg. The first electric pulsing unit preferably is similar to the first electric pulsing unit of the second preferred embodiment. In particular, the high voltage pulses preferably are of a voltage greater than about 5,000 volts, and more preferably the voltage pulses are about 20,000 volts. The pulses are applied for a duration which preferably ranges from about 1 microsecond to about 500 microseconds. The flow rate of the liquid egg through the first electric pulsing unit and the duration of time between each pulse are calibrated so that the liquid egg is subjected to at least two pulses as it passes through the unit. More preferably, the liquid egg is subjected to between about 5 and about 7 electric pulses as the liquid egg passes through the electric pulsing unit.

The electric pulses heat the liquid egg to a temperature preferably between about 140° F. (about 60° C.) and about 145° F. (about 63° C.). More preferably, the liquid egg is heated to a temperature between greater than about.140° F. (about 60° C.) and about 145° F. (about 63° C.).

After passing through the first electric pulsing unit, the liquid egg preferably passes through the cooling section again. The liquid egg is again cooled to between about 120° F. (about 49° C.) and about 140° F. (about 60° C.), and more preferably to between about 130° F. (about 54° C.) and about 139° F. (about 59° C.). Most preferably, the liquid egg is cooled to about 130° F. (about 54° C.).

The liquid egg then preferably passes through a second electric pulsing unit, which preferably operates in a manner similar to the first electric pulsing unit. The liquid egg is again preferably heated to between about 140° F. (about 60° C.) and about 145° F. (about 63° C.), and more preferably to between greater than about 140° F. (about 60° C.) and about 145° F. (about 63° C.).

After being heated by the second pulsing unit, the liquid egg then passes through holding tubes, where it is held for a predetermined period of time. At processing rates and temperatures ranging between about 140° F. (about 60° C.) and about 145° F. (about 63° C.), liquid egg preferably is held for at least about 2.5 minutes, and more preferably, between about 3 minutes and about 4 minutes. The holding time may, however, be shorter than 2.5 minutes, or longer than 4 minutes, depending on the bacterial load present in the liquid egg.

After the liquid egg has passed through the holding tubes, it preferably reaches a flow diversion valve. If the temperature of the liquid egg exiting the holding tubes is below a preset value, then it is presumed that the treatment of the liquid egg is not complete and the liquid egg is channeled back to a balance tank through the flow diversion valve. If, however, the temperature of the liquid egg is at or higher than the preset temperature, the liquid egg is allowed to proceed to the cooling section of the plate heat exchanger for cooling. This ensures that the liquid egg is electroheated to a temperature of at least the preset value. The preset value preferably is at least about 140° F. (about 60° C.).

The cooling section preferably returns the liquid egg to a temperature less than or equal to about 70° F. (about 21° C.). The liquid egg is then aseptically packaged.

The liquid egg can, however, be aseptically packaged before being cooled. In this case, the liquid egg preferably passes directly from the flow diversion valve to the aseptic packager. After being packaged, the liquid egg preferably is cooled to a temperature less than or equal to about 70° F. (about 21° C.).

Liquid egg treated in accordance with the third preferred embodiment of this invention is shelf-stable. The liquid egg has a shelf life of at least 5 days when stored at about 70° F. (about 21° C.). More preferably, the liquid egg has a shelf life of at least 7 days when stored at 70° F. (about 21° C.).

The methods and apparatus of the present invention will be better understood with reference to the embodiments of the present invention shown in FIG. 1–12. Referring to the first preferred embodiment 10 of FIGS. 1–4 and in particular, FIG. 1, liquid egg is transferred from holding tank 1, which is preferably a refrigerated holding tank, to balance tank 2. Of course, liquid egg can be taken from a tank truck or tank car or directly from an egg breaking line as well. Thereafter, the liquid egg is pumped through a timing pump 3 which keeps the liquid egg moving throughout the entire pasteurization apparatus 10. Of course, devices of other configurations known to be useful in conjunction with the pasteurization of food and, in particular, the pasteurization of liquid egg, can also be used.

The liquid egg is then preferably preheated. Any conventional heating apparatus can be utilized to preheat the liquid egg such as ovens, vats and/or steam infusion systems. In addition, electroheating cells can be used to preheat the liquid egg from refrigerated or ambient temperature up to about 140° F. (about 60° C.). Of course, if pasteurization will be conducted using temperatures of about 140° F. (about 60° C.), the maximum preheating temperature utilized should be below about 140° F. (about 60° C.).

A particularly preferred preheating apparatus, however, includes a conventional plate heat exchanger 4. Liquid egg traveling from timing pump 3 is preferably introduced into plate heat exchanger 4 and specifically into the regeneration or preheating section 5 thereof. In accordance with the first preferred embodiment of the present invention, the temperature of the liquid egg preferably is elevated from its initial temperature to a temperature of about 110° F. (about 43° C.) while passing through the regeneration section 5 and heating section 6 of plate heat exchanger 4. Of course, it is possible to use a single stage heat exchanger to accomplish the entire preheating step or to use a heat exchanger having more than just two heating and/or regeneration sections to provide more gradual heating.

After passing through regeneration section 5 and heating section 6, the liquid egg passes through first electroheating unit 7. In first electroheating unit 7, the liquid egg preferably passes through a plurality of electroheating cells (described below) wherein high frequency electric current which is effective to heat the liquid egg without electrolysis is applied to the liquid egg in such a way so as to avoid detrimental coagulation. In a preferred embodiment, liquid egg entering first electroheating unit 7 from the aforementioned plate heat exchanger 4 is preferably elevated from a temperature of about 110° F. (about 43° C.) to a temperature between about 140° F. (about 60° C.) and about 145° F. (about 63° C.), and more preferably, to a temperature between greater than about 140° F. (about 60° C.) and about 145° F. (about 63° C.). A preferred embodiment of first electroheating unit 7 is described in detail below.

After passing through first electroheating unit 7, the liquid egg passes through cooling section 14 of plate heat exchanger 4. The liquid egg is preferably cooled to between about 120° F. (about 49° C.) and about 140° F. (about 60° C.), and more preferably between about 130° F. (about 54° C.) and about 139° F. (about 59° C.). The liquid egg is most preferably cooled to a temperature of about 130° F. (about 54° C.).

The liquid egg then passes through second electroheating unit 15, which preferably is similar to first electroheating unit 7. Second electroheating unit 15 may, however, have fewer electroheating cells than first electroheating unit 7 since the temperature increase of the liquid egg in second electroheating unit 15 is less than the temperature increase of the liquid egg in first electroheating unit 7. The liquid egg is preferably heated to between about 140° F. (about 60° C.)

and about 145° F. (about 63° C.). More preferably, the liquid egg is heated to a temperature between greater than about 140° F. (about 60° C.) and about 145° F. (about 63° C.).

After passing through second electroheating unit 15, the liquid egg preferably passes through cooling section 14 of plate heat exchanger 4 again. The liquid egg is preferably cooled to between about 120° F. (about 49° C.) and about 140° F. (about 60° C.), and more preferably between about 130° F. (about 54° C.) and about 139° F. (about 59° C.). The liquid egg is most preferably cooled to a temperature of about 130° F. (about 54° C.).

The liquid egg then preferably passes through third electroheating unit 16, which preferably is similar to second electroheating unit 15. Third electroheating unit 16 may, for reasons given above, have fewer electroheating cells than first electroheating unit 7.

In third electroheating unit 16, the liquid egg is preferably heated to between about 140° F. (about 60° C.) and about 145° F. (about 63° C.). More preferably, the liquid egg is heated to a temperature between greater than about 140° F. (about 60° C.) and about 145° F. (about 63° C.).

After passing through third electroheating unit 16, the liquid egg then preferably passes through holding tubes 8, where the liquid egg is held for a predetermined period of time. At temperatures ranging between about 140° F. (about 60° C.) and about 145° F. (about 63° C.), liquid egg preferably is held for at least about 2.5 minutes and, preferably, between about 3 minutes and about 4 minutes. The holding time may, however, be shorter than 2.5 minutes, or longer than 4 minutes, depending on the bacterial load present in the liquid egg. For liquid egg having a relative large bacterial load, a holding time of 4 minutes or longer may be desirable. However, for liquid egg having a relatively small bacterial load, a holding time of less than 2.5 minutes may be desirable.

After the liquid egg has passed through holding tubes 8, it preferably reaches flow diversion valve 9. If the temperature of the liquid egg exiting holding tubes 8 is below a preset value, then it is presumed that the treatment of the liquid egg is not complete and the liquid egg is preferably channeled back to balance tank 2 through flow diversion valve 9. If, however, the temperature of the liquid egg is at or higher than the preset temperature, the liquid egg is preferably allowed to proceed to cooling section 14 of plate heat exchanger 4 for cooling. This ensures that the liquid egg has been electroheated to a temperature of at least the preset value. This is true because the temperature of the liquid egg does not significantly change while it is held (i.e., the temperature of the liquid egg after being held is the same as the temperature of the liquid egg after the last electroheating step).

In accordance with the present invention, the preset value preferably is at least about 140° F. (about 60° C.). If, for example, it is desirable to electroheat the liquid egg to 145° F. (about 63° C.), the preset value would also be set to 145° F. (about 63° C.) in order ensure that this temperature is actually attained.

Cooling section 14 preferably returns the liquid egg to a temperature less than or equal to about 70° F. (about 21° C.). The liquid egg then passes from cooling section 14 to packager 11. In accordance with the present invention, packager 11 is an aseptic packager. Aseptic packaging procedures are described in 21 C.F.R. §§ 113.3, 113.40(g), and 113.100(a)(4). Aseptic packaging ensures that a statistically insignificant number of cells are introduced during packaging. Aseptic packaging is well known and can be accomplished with, for example, an International Paper Model SA aseptic packager available from the International Paper Company of Purchase, New York, or a Scholle Model 10-2E aseptic packager available from the Scholle Corporation of Northlake, Ill.

The liquid egg can, however, be aseptically packaged before being cooled. In this case, the liquid egg preferably passes directly from flow diversion valve 9 to aseptic packager 11. After being packaged, the liquid egg preferably is cooled to a temperature less than or equal to about 70° F. (about 21° C.) using a conventional cooling apparatus such as a refrigerator.

Liquid egg produced in accordance with the present invention, including aseptic packaging, is shelf-stable. The liquid egg has a shelf life of at least 5 days when stored at about 70° F. (about 21° C.). More preferably, the liquid egg has a shelf life of at least 7 days when stored at about 70° F. (about 21° C.). The liquid egg substantially retains the functional properties of liquid egg such as, for example, foaming ability, pourability, and emulsification properties.

It is possible, although not necessary to practice the present invention, that the ambient temperature at which the liquid egg is processed will be less than or equal to about 70° F. (about 21° C.). Under such processing conditions, once the liquid egg is has been cooled to about 70° F. (about 21° C.) or lower, it is not necessary to provide further refrigeration to the liquid egg. The liquid egg is simply aseptically packaged and then stored at room temperature, at which it remains stable for at least 5 days. This is a significant improvement over previous liquid egg products as explained below.

Under certain conditions, however, the ambient temperature at which the liquid egg is stored may be greater than about 70° F. (about 21° C.). Warm weather, for example, may cause the temperature within a delivery truck to rise above about 70° F. (about 21° C.). In such circumstances it is preferable to provide refrigeration in order to maintain the temperature of the liquid egg at less than or equal to about 70° F. (about 21° C.). It is preferable to maintain the temperature below 70° F. (about 21° C.) during storage in order to avoid flavor changes that may be caused by chemical changes that may occur if the liquid egg is exposed to temperatures above about 70° F. (about 21° C.). Even if it is necessary to provide refrigeration to maintain the temperature of the liquid egg below about 70° F. (about 21° C.), liquid egg produced in accordance with the present invention is a significant improvement over previous products.

Previous liquid egg pasteurization methods typically require the liquid egg to be stored at temperatures below 40° F. Using previously known techniques, it was necessary to store the liquid egg in a refrigerated warehouse, transport the liquid egg in a refrigerated truck, and display the liquid egg in a refrigerated display case. The equipment and power consumption necessary to keep liquid egg at a temperature below 40° F. is a significant part of the cost of pasteurized liquid egg.

The present invention eliminates the need of these costly refrigeration devices. In accordance with the present invention, the liquid egg should be stored at or below about 70° F. (about 21° C.), at which temperatures it will remain stable for at least 5 days. The cost of storing and shipping the liquid egg is therefore substantially reduced. It is also possible to display the liquid egg produced in accordance with the present invention in a non-refrigerated display case since the ambient temperature in most markets is less than or equal to about 70° F. (about 21° C.). The present invention thus eliminates the need for costly refrigerated display cases and increases customer convenience.

Figure 2:
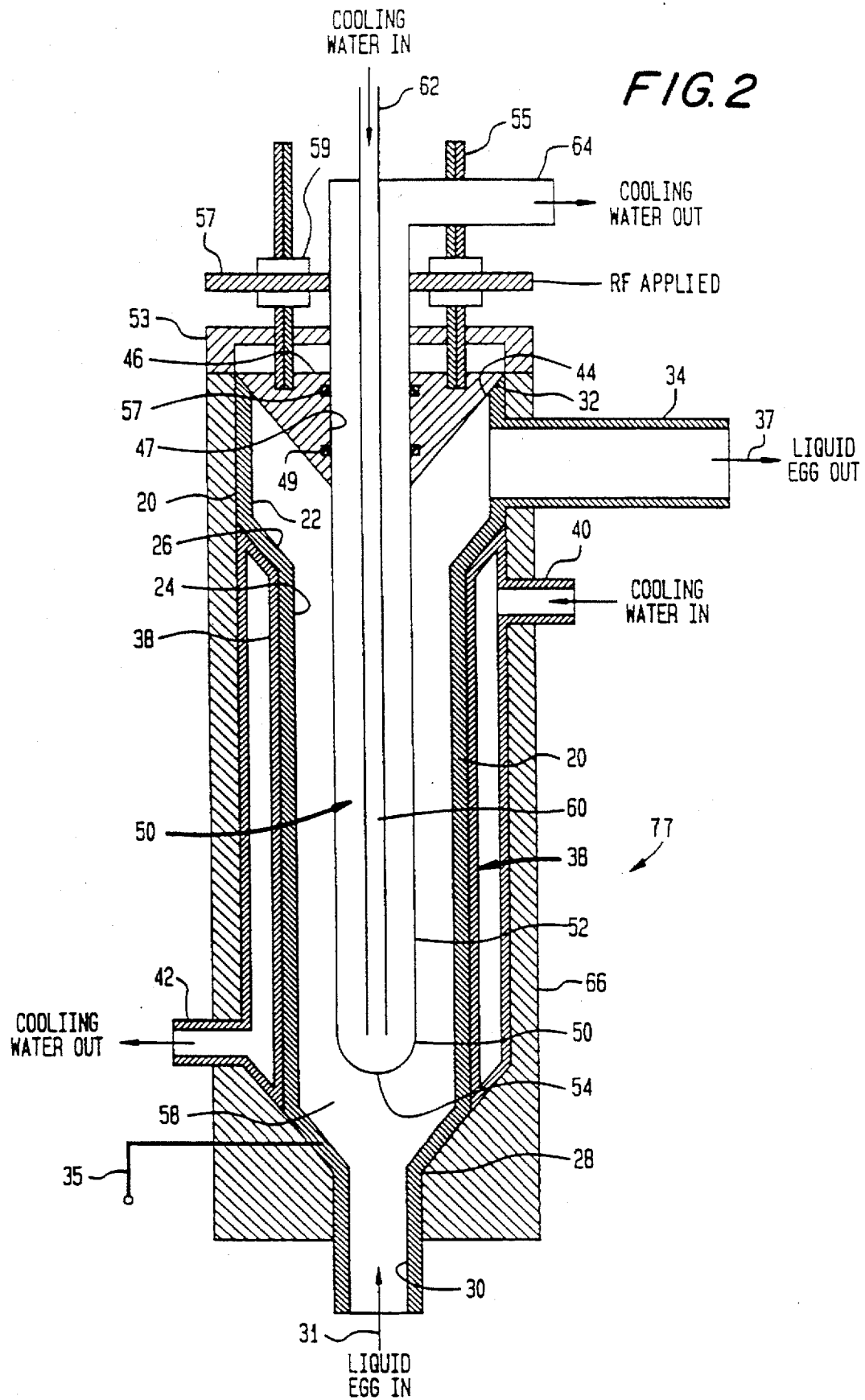
FIG. 2 is a side elevational view, in section, of a preferred concentric electrode cell for use in the electroheating unit of FIG. 1.
Figure 3:
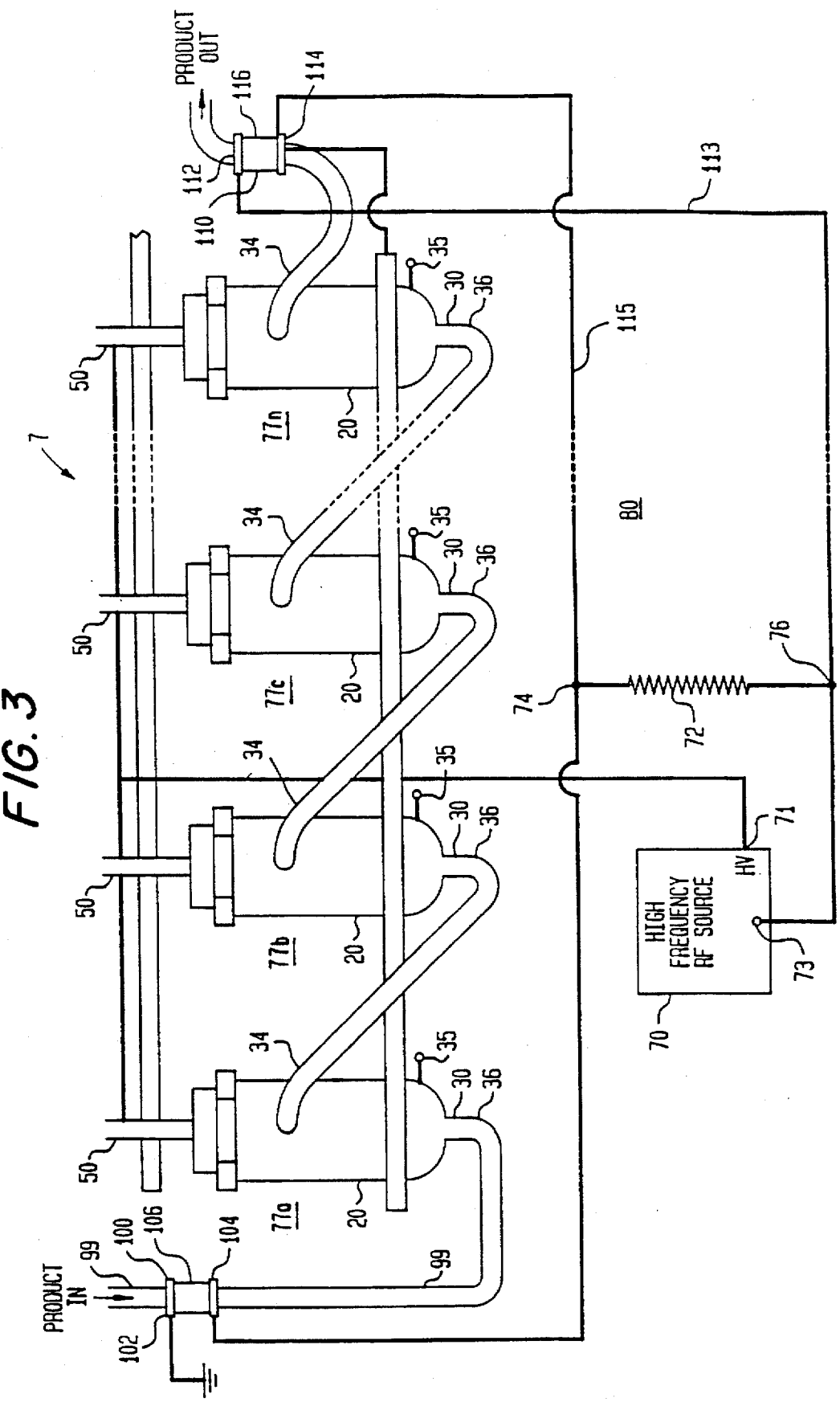
FIG. 3 is a schematic diagram of a preferred embodiment of the electroheating unit of FIG. 1.
Figure 4:
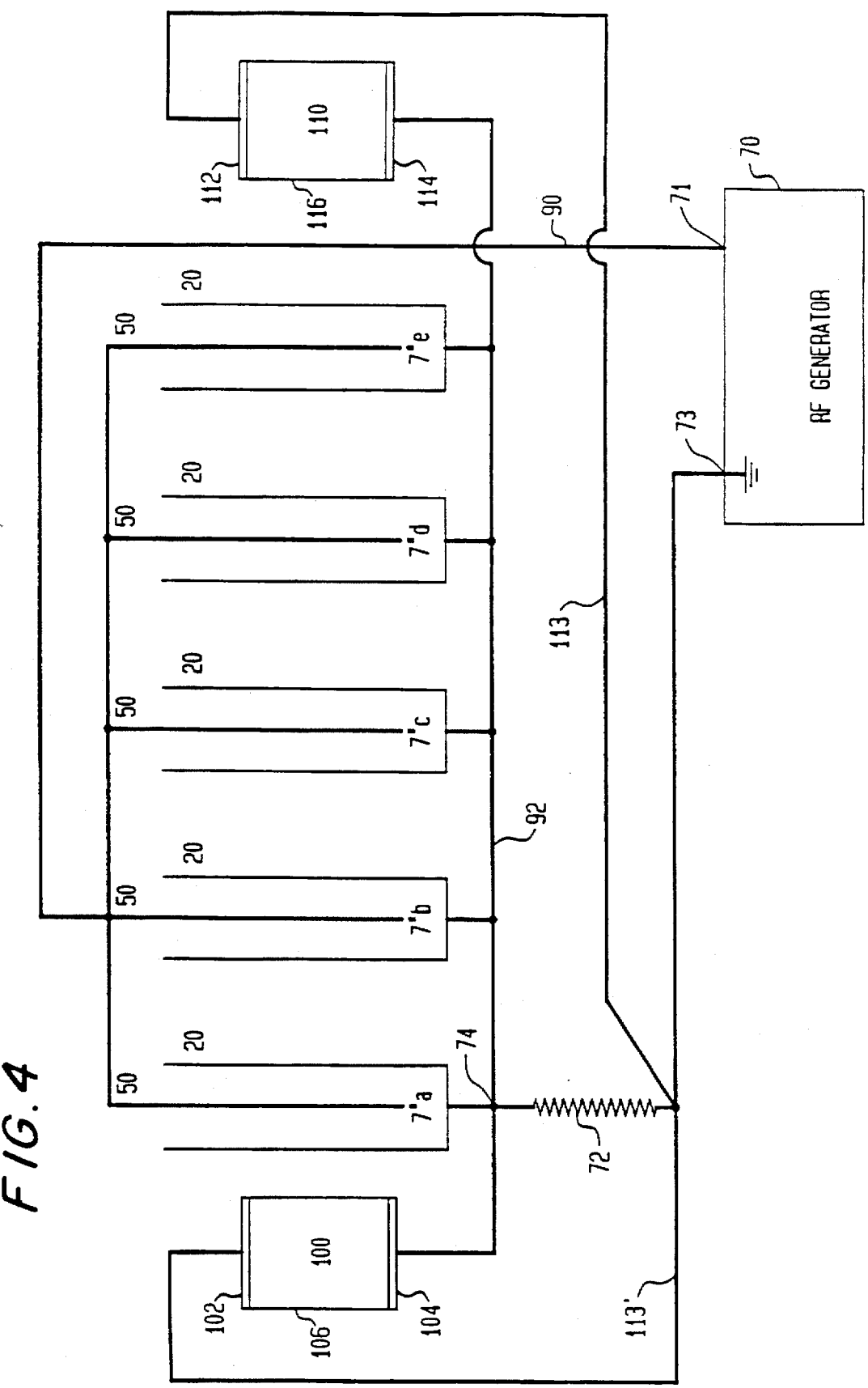
FIG. 4 is a simplified schematic showing an equivalent electronic circuit for the electroheating unit of FIG. 3.

A detailed description of first electroheating unit 7 is now given with reference to FIGS. 2–4. Generally, liquid egg is transported between a plurality of pairs of electrodes and high frequency alternating current is passed therethrough. In general, electroheating in accordance with the present invention preferably uses a source of high frequency electric current which is operably and electrically connected to the electrodes. The term high frequency in accordance with the present invention includes frequencies which are high enough to prevent the electrolysis of food products and the dissolution of the electrodes when in use. Preferably, frequencies between approximately 100 Hz and approximately 450 kHz are used. More preferably, frequencies between about 100 kHz and about 450 kHz and, most preferably, between about 150 kHz and about 450 kHz are used.

In accordance with the present invention, first electroheating unit 7 preferably utilizes electric fields having a strength of 1000 volts/cm or lower and usually, in practice, less than 500 volts/cm. Similarly, relatively low current densities are used. Preferably, current densities of below about 6 amps/cm$^2$ are utilized. More preferably, current densities of below about 3 amps/cm$^2$ are used, and most preferably, current densities of below about 1 amp/cm$^2$ are used.

The power supply or source of high frequency electric current used should be capable of providing a constant flow of energy to the liquid egg through the electrodes. A Westinghouse Pillar Industries Model 125K67, 100 kW RF generator, for example, available from Westinghouse, Inc. of Pittsburgh, Pa., can be used. The generator is capable of operating at 100 Hz to 450 kHz and is rated at 200 kVA input for a 60 Hz line at 480 volts. The RF generator can be operated at a frequency of between about 170 kHz and about 220 kHz and about 38 kW to achieve a 5° F. temperature change at a flow rate of about 25,000 lbs. per hour. All reported voltages are "peak to peak". A good description of electroheating is given in the aforementioned U.S. Pat. No. 5,290,583 of David Reznik and Aloysius Knipper, which is hereby incorporated by reference herein.

The preferred, more preferred, and most preferred embodiments described herein, relate to producing shelf-stable liquid egg from untreated liquid egg having typical bacterial loads. The operating parameters (e.g. voltages, current densities, holding times, etc.) used in order to produce shelf-stable liquid egg may vary, depending on the bacterial load present in the liquid egg. Higher than average bacterial loads generally require longer holding times and/or higher pasteurization temperatures, while shorter holding times and/or lower temperatures may generally be used when treating liquid egg having lower than average bacterial loads. The bacterial load can vary for several reasons. The bacterial load can be different, for example, for eggs received from different farms. The bacterial load can also vary according to the season. For example, warmer temperatures in the summer may lead to generally higher bacterial loads than are present in the winter. For situations in which the bacterial load is greater than usual it may be advantageous, for example, to heat the liquid egg to slightly higher temperatures. This can be accomplished, for example, by increasing the current density which passes through the liquid egg, thereby increasing the amount of resistive heating which occurs within the liquid egg. It will be clear to those skilled in the art that various other modifications of the operating parameters and construction of the apparatus can be made in response to variations of the bacterial load in order to produce shelf-stable liquid egg in accordance with the present invention.

Reference is now made to FIG. 2 which shows concentric electrode electroheating cell 77 which can be used in first electroheating unit 7. Electroheating cell 77 preferably has body 20 which preferably is made of stainless steel. Body 20 is the first electrode of the concentric electrode pair included in electroheating cell 77. In a particularly preferred configuration, body 20 has a first cylindrical portion 22 and a second cylindrical portion 24 of a lesser outer diameter connected to the first cylindrical portion 22 by a tapered section 26. At the free end 28 of cylindrical portion 24 is an inlet tube 30 through which liquid egg preferably may be introduced in the direction of arrow 31 into the gap between the electrodes as will be more fully described below. Adjacent the opposite free end 32 of the cylindrical portion 22 is an outlet tube 34 through which the electroheated food preferably may exit in the direction of arrow 37 to holding tubes 8 or to further electroheating cells. As illustrated in FIG. 3, outlet tube 34 of the leftmost electroheating cell 77a is preferably connected to the electroheating cell 77b at inlet tube 30 thereof by means of suitable tubes or piping 36.

A cylindrical cooling jacket 38 can be placed about cylindrical portion 24 of body 20. An inlet tube 40 preferably is provided to the cooling jacket 38 at the upper end of cylindrical portion 24 adjacent tapered portion 26 and an outlet tube 42 preferably is provided adjacent the free end 28 of cylindrical portion 24. Fluids such as cold liquids (water, glycol or alcohol) or cooled gases may be circulated through cooling jacket 38 to help conduct away heat generated at the surface of the electrode by the electroheating carried out within the cell 77.

A jacket 66 of insulation or other protective of these materials may be placed outside of body 20 and cooling jacket 38 to prevent heat or cooling loss and/or to protect nearby operators.

Also placed in free end 32 of cylindrical portion 22 is an aperture 44 into which is preferably fitted an insulator 46 which may be made of non-tracking materials of rubber, ceramics or plastic. In a preferred embodiment, the insulator 46 is made of DELRIN®, a polyacetate homopolymer available from the E. I. du Pont de Nemours & Company, of Wilmington, Del., or CELCON®, an acetyl copolymer available from the Celanese Corporation of New York, N.Y.

Insulator 46 preferably has a central aperture 47 into which is preferably placed the second or central electrode 50. A series of O-rings such as 49 and 51 are disposed in central aperture 47 which preferably engage the outer surface of central electrode 50 when it is placed in aperture 47 of insulator 46 to prevent the passage of the liquid egg out of cell 77 along the outside of central electrode 50 or the passage of external contaminants into the cell 77 by the same route. Preferably fitted above insulator 46 about the free end 32 of cylindrical portion 22 is a hollow cap 53. Two threaded studs 55 preferably are anchored in insulator 46 at one end and preferably exit via corresponding apertures in cap 53. The threaded studs 55 preferably pass through corresponding apertures in a support plate 57. Adjustment nuts 59 preferably are placed on the threaded studs 55 on adjacent both surfaces of support plate 57. The entire central electrode 50 preferably can be moved upwardly within hollow cap 53 by tightening up on adjustment nuts 59 above the support plate 57, while the ones below plate 57 preferably limit the extent of upward movement. By loosening the nuts 59 above plate 57, the entire central electrode 50 preferably can be lowered into body 20, limited by the inclined shape of the insulator 46 itself.

The central electrode 50 preferably is fabricated of stainless steel. Central electrode 50 may be made up of a central tube 52 preferably with a rounded distal end 54 giving the general appearance of a test tube. A source of RF energy preferably is connected to tube 52 via the support plate 57 which preferably is electrically connected to each of the central electrodes 50 of each of the cells 77 of the electroheater so that the central electrodes 50 preferably can act as the second electrode of the electroheating device. The source of high frequency AC electric current used preferably is an RF generator which provides a constant current by varying the voltage.

A tube 60 preferably is inserted into tube 52 so that its distal end is short of the distal end 54 of tube 52. A source of cooling fluid as previously described preferably is connected to inlet 62 of tube 60 and allowed to flow out into tube 52 and are removed at outlet 64 at the opposite end of tube 52 from distal end 54.

Turning next to FIG. 3, there is shown first electroheating unit 7 which preferably includes a plurality of sight glass electrode cells and the concentric electrode cells 77 just described. Sight glass electrode cell 100 preferably is added at the product input line 99 to the first electroheating cell 77a of the electroheater. The sight glass electrode cell 100 preferably includes metallic end plates or conductive collars 102 and 104 separated by an insulating glass tube 106 of appropriate length, diameter and bore. The end plates 102 and 104 act as electrodes and current passes between them against and parallel to the flow of food as explained below. Glass tube 106 may be composed of an insulating glass material such as KIMAX® heat resistant glass available from Kimble Glass of Toledo, Ohio. The end plates 102 and 104 preferably include an aperture through which food can pass. In fact, the end plates 102 and 104 preferably are conductive pipe used to carry the liquid egg to and from the tube 106. A collar and seal preferably are used to seat and attach the insulating tube 106.

Liquid egg preferably enters the electroheater through conduit or input line 99 and flows into electroheating cell 100. The liquid egg preferably flows through the aperture in first electrode or end plate 102 into the interior of the hollow insulating member, glass tube 106. Finally, the liquid egg exits sight glass electrode cell 100 by passing through the aperture in end plate 104. End plate 104 preferably is connected to one side 74 of a resistor or tank coil 72. The other side 76 of resistor or tank 72 preferably is connected to the second terminal 73 of high frequency RF power source 70, which is the system ground. End plate 104 preferably is also connected to the output of the concentric electrodes, common return 92, as described herein. End plate 102 preferably is connected to system ground terminal 73 of power source 70 through lead 113'. Glass tube 106 has an inside diameter of about 2" and length of about 14".

A second sight glass electrode cell 110 preferably is provided and preferably is constructed in the same manner as sight glass electrode cell 100. This second sight glass electrode cell 110 preferably is in fluid communication with outlet 34 of the concentric electrodes to receive food electroheated in cell 77e. Electroheating cell 110 has an end plate 112 connected to the system ground terminal 73 of source 70 via lead 113. End plate 114 is connected to the side 74 of resistor or tank coil 72 and to said common return 92. A second glass tube 116 preferably is disposed between the respective end plates 112 and 114. Each of said end plates or electrodes 112 and 114 preferably has an aperture through which food enters the electroheating cell 110 and exits therefrom, thus exiting the electroheater. Glass tube 116 preferably has an inside diameter of 2" and a length of 16". The remaining electroheating cells used are the concentric electrode containing cells 77.

In operation, liquid egg is electroheated in electroheating cell 100 by the passage of high frequency AC current from end plate 104 to end plate 102. The liquid egg then preferably travels through inlet tube 30 into concentric electroheating cell 77a and between electrodes 20 and 50 thereof. As illustrated in FIG. 3, once the liquid egg is electroheated again between electrodes 50 and 20 of electroheating cell 77a, the liquid egg preferably flows through outlet tube 34 thereof which is connected to a second concentric-electrode containing electroheating cell 77b by means of a suitable tube or pipe 36. Concentric electrode-containing electroheating cells 77c, 77d and 77e are connected to each other and to electroheating cell 77b in the same manner that electroheating cell 77b is connected to electroheating cell 77a. After being electroheated in concentric electrode-containing cell 77e, the liquid egg exits through outlet 34 and then enters into sight glass electrode cell 110 where it is again electroheated. The liquid egg then leaves the electroheater through the aperture in electrode 112.

Referring to FIG. 4, the flow of electric current through the system takes a path quite different from that taken by the liquid egg. First, high frequency alternating electric current leaves RF generator 70 through output 71 and is fed by lead 90 to the five concentric electrode containing parallel electroheating cells 77. The frequency of the electric current is preferably between about 100 Hz and about 450 kHz. More preferably, the frequency is between about 100 kHz and about 450 kHz. Most preferably, the frequency is between about 150 kHz and about 450 kHz. For illustration purposes, the voltage produced by RF generator 70 is about 3200 volts. The high potential lead 90 preferably is introduced directly into electroheating cell 77b through electrode 50 thereof. Other leads preferably take the energy to each of the other electrodes 50 of electroheating cells 77, respectively.

The average voltage drop across the gap between all electrodes 50 and electrodes 20 is, for example, 200 volts. Thus the voltage measured at electrodes 20 preferably should be approximately 3000 volts. The 200 volt drop is transferred to the liquid egg as heat. The current applied is about 190 amps. Of course, currents of up to about 400 amps or more are also contemplated. The electrical energy remaining after electroheating liquid egg in electroheating cells 77 is then transferred to other portions of the electroheater by common return 92. In FIG. 4, common return 92 is shown as a lead. In fact, high frequency RF energy can travel along the outer skin of the concentric electrode containing cells 77 and from one cell to another via the pipes or conduits (inlet 99, inlets 30, outlet 34, connecting tube 36, and the like). Common return 92 conveys electric current to each of the sight glass electrodes 100 and 110 through end plates 104 and 114, respectively. Common return 92 preferably is also connected to resistor or tank coil 72 at end 74 thereof which is arranged in parallel with the sight glass electrodes 100 and 110. At the stated preferences, three thousand volts is therefore applied across tank coil 72 and across the sight glass electrodes 100 and 110.

To complete the current flow, the electric energy traverses the gap between end plate 104 and end plate 102 and end plate 114 and end plate 112, respectively, each of which is linked back to system ground 73 via leads 113' and 113, respectively. A second end 76 of resistor or tank coil 72 is also attached to system ground 73. The resistor or tank coil 72, in one embodiment, is a coil of copper tubing. In another embodiment, however, the tank coil or resistor 72 is merely a 20' or 30' long piece of copper tubing (½" to ⅝" outside diameter). A substantial portion of the current of the system returns to system ground 73 through resistor or tank coil 72, thereby bypassing the sight glass electrodes 100 and 110. This explains why the sight glass electrodes described herein are relatively high voltage (3000 volts peak to peak) and relatively low current (approximately 15 amps calculated). Higher or lower currents are also contemplated. Such a device is disclosed in U.S. patent application Ser. No. 08/071,572 filed on Jan. 22, 1993 in the name of Thaddeus J. Polny, Jr. entitled "Methods and Apparatus for Electroheating Food Employing Concentric Electrodes" which is hereby incorporated by reference herein.

It will be clear to those skilled in the art that in accordance with the present invention, the number of electroheating cells 77 can be fewer or more than the four cells shown in FIGS. 3 and 4. The present invention can, for example, be practiced with only two concentric electrode electroheating cells and two sight glass cells. In such an embodiment each cell can, for example, raise the temperature of the liquid egg by about 7.5° F. (about 4° C., thereby increasing the temperature of the liquid egg from about 110° F. (about 43° C.) to about 140° F. (about 60° C.) after passing through all four electroheating cells. It will also be clear to those skilled in the art that the embodiment shown in FIGS. 1–4 can be practiced without the use of sight glass electrode cells 100 and 110.

Thus, a first preferred embodiment of the present invention has been described. Liquid egg treated in accordance with this embodiment has a shelf life of at least 5 days when stored at about 70° F. (about 21° C.). More preferably, liquid egg treated in accordance with the first preferred embodiment has a shelf life of at least 7 days when stored at about 70° F. (about 60° C.).

Figure 5:
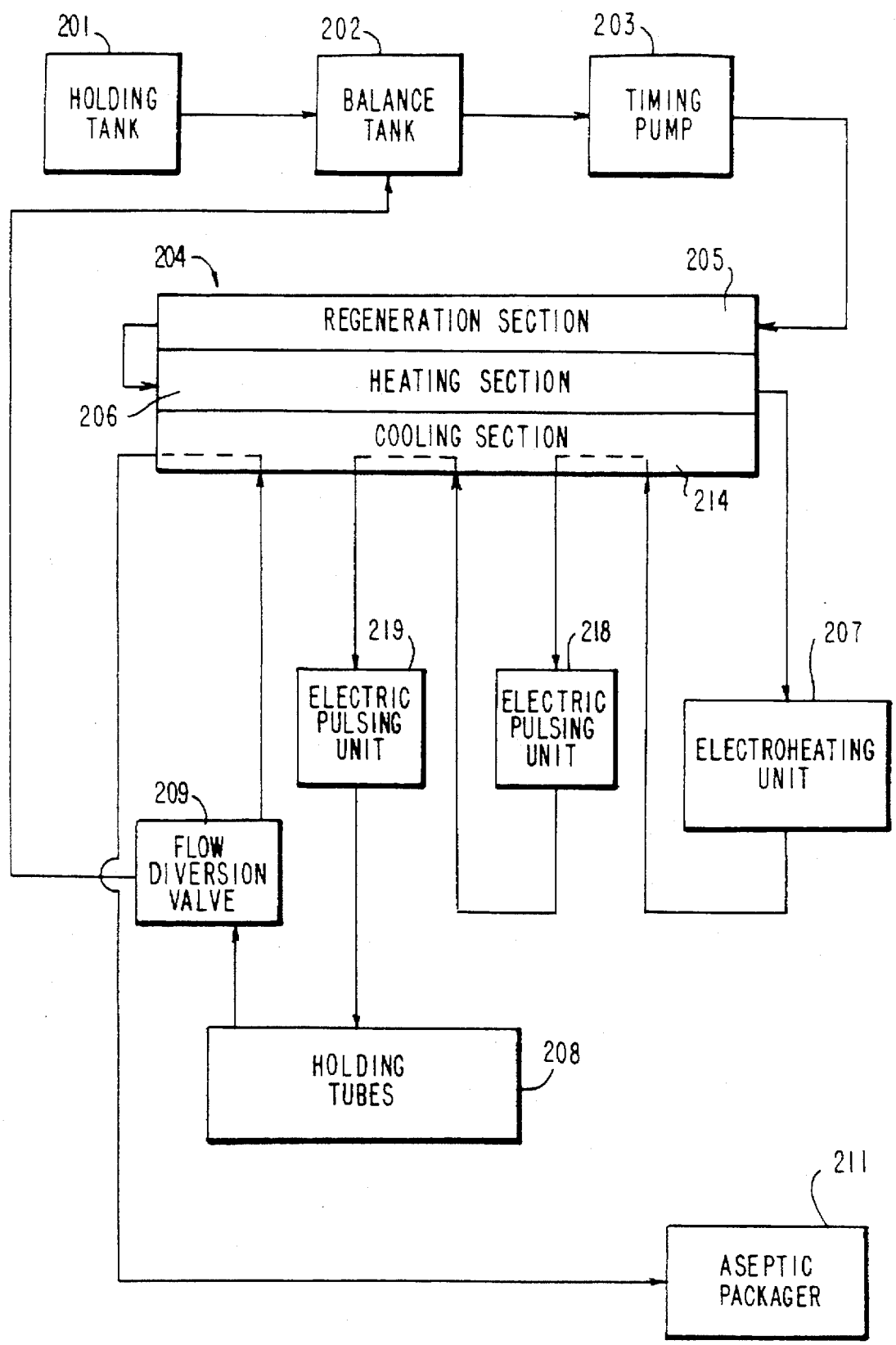
FIG. 5 is a second preferred embodiment of an electroheating apparatus for producing shelf-stable liquid egg in accordance with the present invention.
Figure 6:
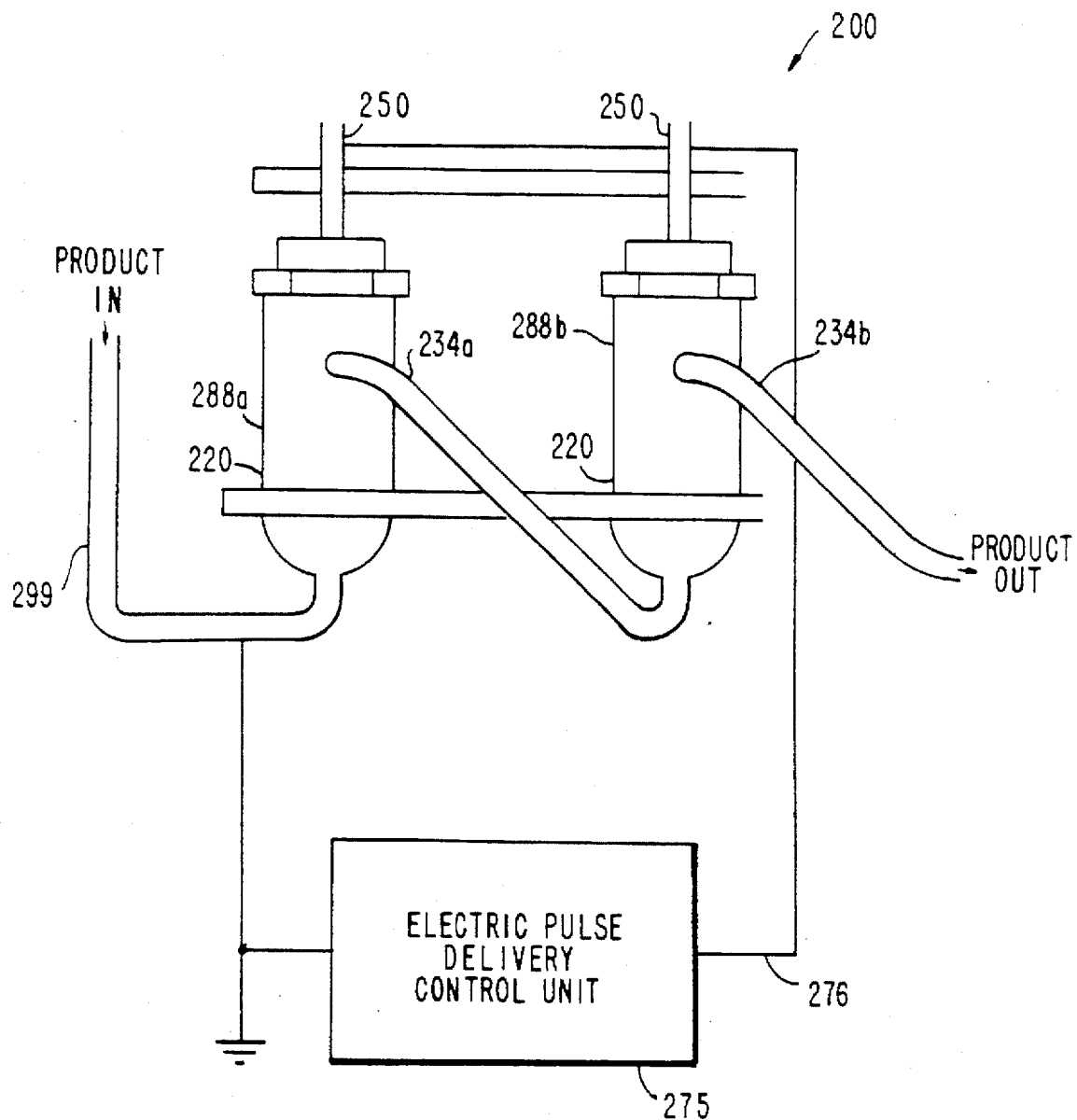
FIG. 6 is a schematic diagram of a preferred electric pulsing cell for use in the apparatus of FIG. 5.
Figure 7:
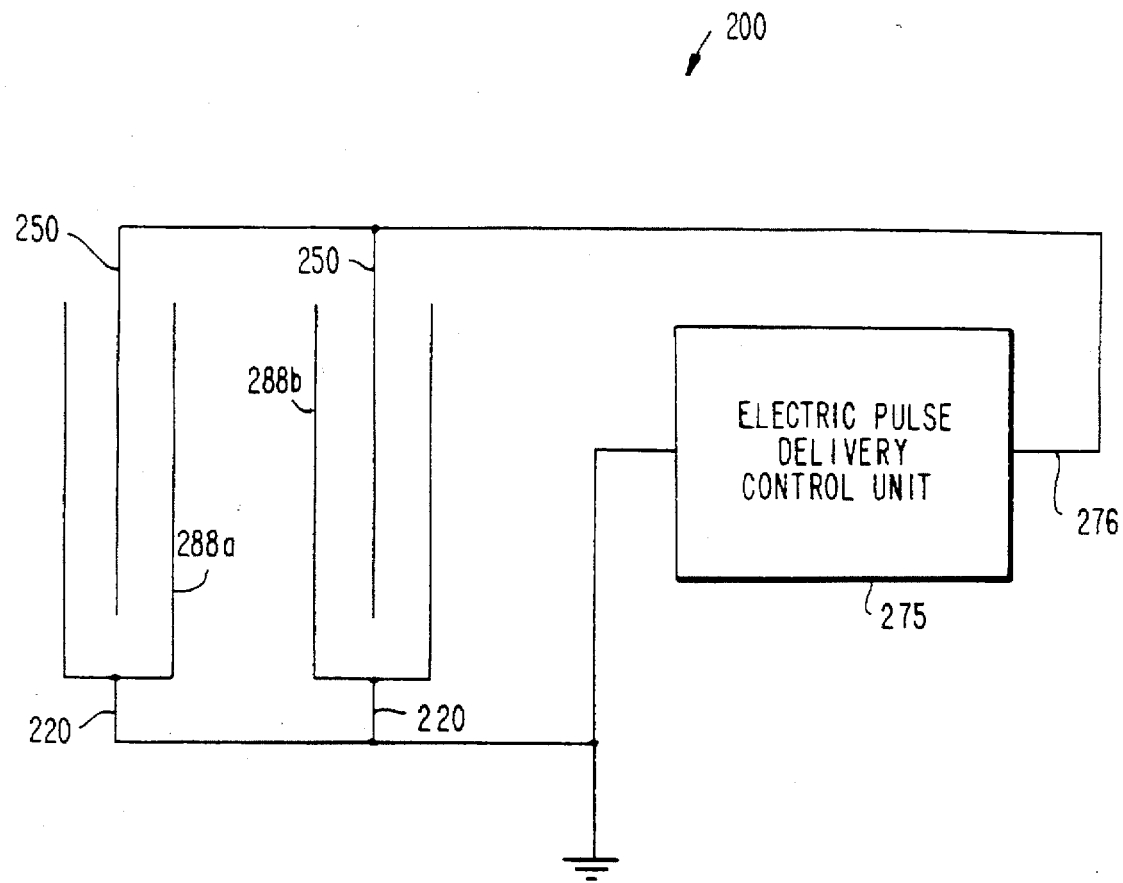
FIG. 7 is a simplified schematic showing an equivalent electronic circuit for the electric pulsing cell of FIG. 6.

A second preferred embodiment of the present invention is shown in FIGS. 5–7. Holding tank 201, balance tank 202, timing pump 203 and plate heat exchanger 204 including regeneration section 205, and heating section 206 work in substantially the same manner as the respective devices shown in FIG. 1. In particular, regeneration section 205 and heating section 206 preferably heat the liquid egg to a temperature of about 110° F. (about 43° C.). In accordance with the second preferred embodiment, the liquid egg then passes to electroheating unit 207 which works in substantially the same manner as first electroheating unit 7 of FIGS. 1–4. The electroheating unit 207 preferably heats the liquid egg to a temperature of between about 140° F. (about 60° C.) and about 145° F. (about 63° C.). More preferably, electroheating unit 207 heats the liquid egg to a temperature between greater than about 140° F. (about 60° C.) and about 145° F. (about 63° C.).

After passing through electroheating unit 207, the liquid egg preferably passes through cooling section 214 of plate heat exchanger 204 wherein the liquid egg preferably is cooled to a temperature between about 120° F. (about 49° C.) and about 140° F. (about 60° C.), and more preferably between about 130° F. (about 54° C.) and about 139° F. (about 59° C.). The liquid egg is most preferably cooled to a temperature of about 130° F. (about 54° C.).

After being cooled, the liquid egg passes through first electric pulsing unit 218, wherein a plurality of high voltage electric pulses are applied to the liquid egg. The high voltage pulses preferably are of a voltage greater than about 5,000 volts, and more preferably of a voltage of about 20,000 volts. The pulses are applied for a duration which preferably ranges from about 1 microsecond to about 500 microseconds. The flow rate of the liquid egg through first electric pulsing unit 218 and the duration of time between each pulse preferably are calibrated so that the liquid egg is subjected to at least two pulses as it passes through the unit 218. More preferably, the liquid egg is subjected to between about 5 and about 7 electric pulses as the liquid egg passes through electric pulsing unit 218. In stating that, for example, 5 pulses are applied to the liquid egg as it passes through an electric pulsing cell, the following is meant. If one particular volume element of liquid egg is followed as it passes through an electric pulsing cell, that volume element will receive 5 electric pulses as it passes through the cell. It will thus be apparent to those skilled in the art that it is necessary to coordinate the speed at which the egg travels with the time between pulses to ensure that this is true. It will also be clear to those skilled in the art that such a coordination between the speed of the egg and the time between pulses can easily be accomplished.

The electric pulses preferably heat the liquid egg to a temperature between about 140° F. (about 60° C. and about 145° F. (about 63° C.). More preferably, the liquid egg is heated to a temperature between greater than about 140° F. (about 60° C.) and about 145° F. (about 63° C.). Electric pulsing unit 218 is described in detail below.

After passing through first electric pulsing unit 218, the liquid egg preferably passes through cooling section 214 again. The liquid egg preferably is again cooled to between about 120° F. (about 49° C.) and about 140° F. (about 60° C.), and more preferably to between about 130° F. (about 54° C.) and about 139° F. (about 59° C.). Most preferably, the liquid egg is cooled to about 130° F. (about 54° C.).

The liquid egg then preferably passes through second electric pulsing cell 219, which preferably is similar to first pulsing unit 218 and preferably operates in a manner which is similar to first pulsing unit 218. The liquid egg is again preferably heated to between about 140° F. (about 60° C.) and about 145°, and more preferably to between greater than about 140° F. (about 60° C.) and about 145° F. (about 63° C.).

After being heated by second pulsing unit 219, the liquid egg then passes through holding tubes 208, where it is held for a predetermined period of time. At processing rates and temperatures ranging between about 140° F. (about 60° C.) and about 145° F. (about 63° C.), the liquid egg preferably is held for at least about 2.5 minutes and, more preferably, between about 3 minutes and about 4 minutes. The holding time may, however, be shorter than 2.5 minutes, or longer than 4 minutes, depending on the bacterial load present in the liquid egg.

After the liquid egg has passed through holding tubes 208, it reaches flow diversion valve 209. If the temperature of the liquid egg exiting holding tubes 208 is below a preset value, then it is presumed that the treatment of the liquid egg is not complete and the liquid egg is channeled back to balance tank 202 through flow diversion valve 209. If, however, the temperature of the liquid egg is at or higher than the preset temperature, the liquid egg is allowed to proceed to cooling section 214 of plate heat exchanger 204 for cooling. This ensures that the liquid egg has been electroheated to a temperature of at least the preset value. This is true because the temperature of the liquid egg does not significantly change while it is held (i.e., the temperature of the liquid egg after being held is the same as the temperature of the liquid egg after the last electroheating step).

In accordance with the present invention, the preset value preferably is at least about 140° F. (about 60° C.). If, for example, it is desirable to electroheat the liquid egg to 145° F. (about 63° C.), the preset value would also be set to 145° F. (about 63° C.) in order ensure that this temperature is actually attained.

Cooling section 214 preferably returns the liquid egg to a temperature less than or equal to about 70° F. (about 21° C.). The liquid egg is then aseptically packaged in aseptic packager 211.

The liquid egg can, however, be aseptically packaged before being cooled. In this case, the liquid egg preferably passes directly from flow diversion valve 209 to aseptic packager 211. After being packaged, the liquid egg preferably is cooled to a temperature less than or equal to about 70° F. (about 21° C.) using a conventional cooling apparatus such as a refrigerator.

The liquid egg treated in accordance with the second preferred embodiment of this invention is shelf-stable. The liquid egg has a shelf life of at least 5 days when stored at about 70° F. (about 21° C.). More preferably the liquid egg has a shelf life of at least 7 days when stored at 70° F. (about 21° C.). The liquid egg substantially retains the functional properties of liquid egg such as, for example, foaming ability, pourability, and emulsification properties.

The combination of electroheating the liquid egg by applying high frequency current in electroheating unit 207 and applying high voltage pulses to the liquid egg in pulsing cells 218, 219 is thought to be particularly useful at killing spoilage bacteria in the liquid egg. This is thought to be true for at least two reasons. First, the high voltage, short time duration pulses are thought to be effective at killing spoilage bacteria which are able to survive the lower voltage, high frequency treatment of electroheating unit 207. Second, it is believed that the stress of repeated heating and cooling is detrimental to spoilage bacteria.

Liquid egg produced in accordance with the second preferred embodiment of the present invention provides all the advantages of shelf-stable liquid egg which were described above in reference to the first preferred embodiment. In particular, the need for costly refrigeration equipment is eliminated.

Reference is now made to FIGS. 6 and 7 which show electric pulsing unit 200 which can be used as first and second electric pulsing units 218, 219. A general description of electrical pulsing techniques is given in the aforementioned U.S. Pat. No. 4,695,472, which is hereby incorporated by reference herein.

Referring to FIG. 6, electric pulsing unit 200 preferably comprises at least two electric pulsing cells 288a and 288b. Each of the electric pulsing cells 288a and 288b preferably is substantially identical to the concentric electrode cell 77 shown in FIG. 2. Having been described in detail above, the concentric electrode cell will not be described further here. Electric pulse delivery control unit 275 preferably applies high voltage pulses from high voltage output 276 to cells 288a and 288b via central electrodes 250 and return electrode 220, which is connected to ground. Liquid egg enters cell 288a through input line 299. After being subjected to a plurality of high voltage electric pulses, the liquid egg passes through outlet tube 234a and into electric pulsing cell 288b. The liquid egg preferably is again subjected to a plurality of high voltage electric pulses in cell 288b. The liquid egg then passes through outlet tube 234b and is carried to cooling section 214 of FIG. 5.

FIG. 7 is a schematic diagram of the equivalent electrical circuit of electric pulsing unit 200. Electric pulse delivery control unit 275 applies voltage pulses through high voltage output 276 which is connected to electrodes 250. Electric pulse delivery control unit 275 is entirely conventional. Unit 275 delivers an electric pulse of at least 5,000 volts across electrodes 220 and 250. More preferably, unit 275 delivers an electric pulse of about 20,000 volts across the electrodes. The electric field strength is preferably greater than about 5,000 volts/cm.

The duration of the electric pulse is preferably between 1 microsecond and about 100 microseconds. The pulse can be an essentially DC electric pulse (i.e., it can be of approximately constant voltage). The electric pulse can also be generated by discharging a capacitor in control unit 275, in which case the voltage is a decreasing function of time (i.e., the voltage becomes lower with time during the pulse).

As the liquid egg passes through a pulsing cell 288a or 288b, a plurality of electric pulses are applied to the liquid egg. Preferably, between about 5 and about 7 pulses are applied to the liquid egg.

It is important to eliminate arcing in the pulsing cells. It may be necessary depending on the processing conditions, and in particular, on the spacing between the electrodes 220 and 250, to adjust the voltage so that arcing does not occur. Excessive arcing can cause fouling of the apparatus and odor in the liquid egg. Arcing can also cause coagulation of the liquid egg and caking of the liquid egg on the electrodes. Destruction of proteins in the liquid egg can also be caused by arcing.

Thus, a second preferred embodiment of the present invention has been described with reference to FIGS. 5–7. Liquid egg treated in accordance with this embodiment has a shelf life of at least 5 days when stored at 70° F. (about 21° C.). More preferably the liquid egg has a shelf life of at least 7 days when stored at 70° F. (about 21° C.).

Figure 8:
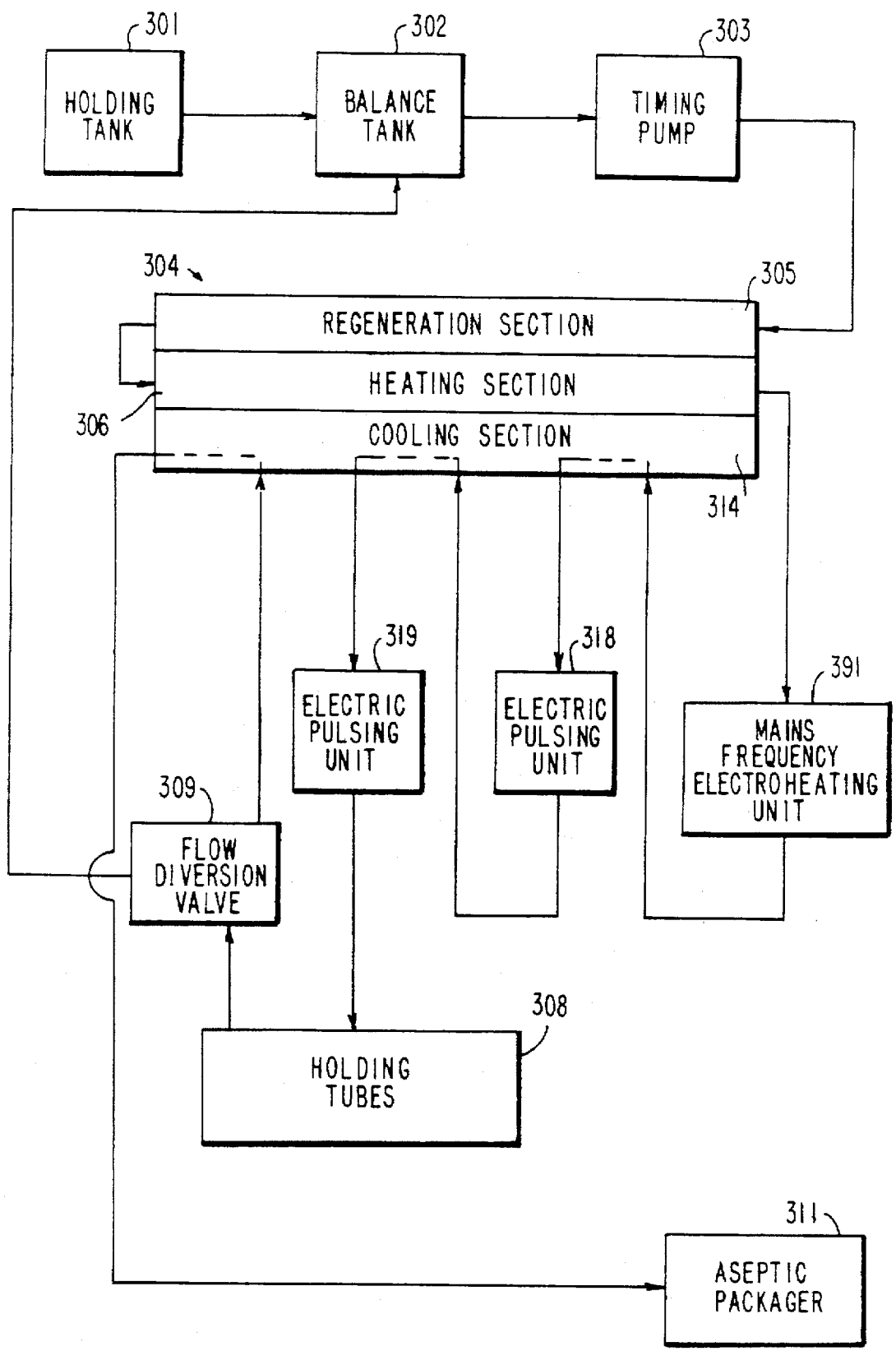
FIG. 8 is a schematic drawing of a third preferred embodiment of an electroheating apparatus for producing shelf-stable liquid egg in accordance with the present invention.

A third preferred embodiment of the present invention is shown in FIGS. 8–12. Referring to FIG. 8, holding tank 301, balance tank 302, timing pump 303, plate heat exchanger 304 (including regeneration section 305, heating section 306, and cooling section 314), holding tubes 308, flow diversion valve 309, aseptic packager 311, first electric pulsing cell 318, and second electric pulsing cell 319 preferably operate in substantially the same manner as the corresponding elements of FIG. 5. In particular, the liquid egg is preheated by regeneration section 305 and heating section 306 to a temperature of about 110° F. (about 43° C.). In this embodiment, however, after being preheated, the liquid egg is passed to mains frequency electroheating unit 391. Mains frequency electroheating unit 391 preferably heats the liquid egg from about 110° F. (about 43° C.) to a temperature between about 140° F. (about 60° C.) and about 145° F. (about 63° C.). More preferably, mains frequency electroheating unit 391 heats the liquid egg to a temperature between greater than about 140° F. (about 60° C.) and about 145° F. (about 63° C.).

Mains frequency electroheating unit 391 heats the liquid egg by passing a current having a frequency between about 30 Hz and about 99 kHz through the liquid egg. More preferably, a frequency between about 50 Hz and about 10 kHz is used. Most preferably, a frequency between about 50 Hz and about 90 Hz is used. The voltages used in mains frequency electroheating unit 391 are preferably between about 50 volts and about 500 volts. The current densities used are preferably less than about 4 amps/cm$^2$, and more preferably, less than about 1 amp/cm$^2$. Mains frequency electroheating unit 391 is described in detail below.

After passing through mains frequency electroheating unit 391, the liquid egg preferably passes through cooling section 314 of plate heat exchanger 304 wherein the liquid egg is cooled. The liquid egg is preferably cooled to a temperature between about 120° F. (about 49° C.) and about 140° F. (about 60° C.), and more preferably between about 130° F. (about 54° C.) and about 139° F. (about 59° C.). The liquid egg is most preferably cooled to a temperature of about 130° F. (about 54° C.).

After being cooled, the liquid egg passes through first electric pulsing unit 318, wherein a plurality of high voltage electric pulses are applied to the liquid egg. First electric pulsing unit 318 preferably is substantially the same as the first electric pulsing unit 218 of FIGS. 5–7. In particular, the high voltage pulses preferably are of a voltage greater than about 5,000 volts, and more preferably of a voltage of about 20,000 volts. The pulses are applied for a duration which preferably ranges from about 1 microsecond to about 500 microseconds. The flow rate of the liquid egg through first electric pulsing unit 318 and the duration of time between each pulse are calibrated so that the liquid egg preferably is subjected to at least two pulses as it passes through the unit 318. More preferably, the liquid egg is subjected to between about 5 and about 7 electric pulses as it passes through electric pulsing unit 318.

The electric pulses heat the liquid egg to a temperature preferably between about 140° F. (about 60° C.) and about 145° F. (about 63° C.). More preferably, the liquid egg is heated to a temperature between greater than about 140° F. (about 60° C.) and about 145° F. (about 63° C.).

After passing through first electric pulsing unit 318, the liquid egg preferably passes through cooling section 314 again. The liquid egg preferably is again cooled to between about 120° F. (about 49° C.) and about 140° F. (about 60° C.), and more preferably to between about 130° F. (about 54° C.) and about 139° F. (about 59° C.). Most preferably, the liquid egg is cooled to about 130° F. (about 54° C.).

The liquid egg preferably then passes through second electric pulsing unit 319, which operates in substantially the same manner as first electroheating unit 318. The liquid egg is again preferably heated to between about 140° F. (about 60° C.) and about 145° F. (about 63° C.), and more preferably to between greater than about 140° F. (about 60° C.) and about 145° F. (about 63° C.).

After being heated by second pulsing unit 319, the liquid egg then preferably passes through holding tubes 308, where it is held for a predetermined period of time. At processing rates and temperatures ranging between about 140° F. (about 60° C. and about 145° F. (about 63° C.), liquid egg preferably is held for at least about 2.5 minutes and, more preferably, between about 3 minutes and about 4 minutes. The holding time may, however, be shorter than 2.5 minutes, or longer than 4 minutes, depending on the bacterial load present in the liquid egg.

After the liquid egg has passed through holding tubes 308, it preferably reaches flow diversion valve 309. If the temperature of the liquid egg exiting holding tubes 308 is below a preset value, then it is presumed that the treatment of the liquid egg is not complete and the liquid egg is channeled back to balance tank 302 through flow diversion valve 309. If, however, the temperature of the liquid egg is at or higher than the preset temperature, the liquid egg preferably is allowed to proceed to cooling section 314 of plate heat exchanger 304 for cooling. This ensures that the liquid egg has been electroheated to a temperature of at least the preset value. This is true because the temperature of the liquid egg does not significantly change while it is held (i.e., the temperature of the liquid egg after being held is the same as the temperature of the liquid egg after the last electroheating step).

In accordance with the present invention, the preset value preferably is at least about 140° F. (about 60° C.). If, for example, it is desirable to electroheat the liquid egg to 145° F. (about 63° C.), the preset value would also be set to 145° F. (about 63° C.) in order ensure that this temperature is actually attained.

Cooling section 314 preferably returns the liquid egg to a temperature less than or equal to about 70° F. (about 21° C.). The liquid egg is then aseptically packaged in aseptic packager 311.

The liquid egg can, however, be aseptically packaged before being cooled. In this case, the liquid egg preferably passes directly from flow diversion valve 309 to aseptic packager 311. After being packaged, the liquid egg preferably is cooled to a temperature less than or equal to about 70° F. (about 21° C.) using a conventional cooling apparatus such as a refrigerator.

The liquid egg treated in accordance with the third preferred embodiment of this invention is shelf-stable. The liquid egg has a shelf life of at least 5 days when stored at about 70° F. (about 21° C.). More preferably the liquid egg has a shelf life of at least 7 days when stored at about 70° F. (about 21° C.). The liquid egg substantially retains the functional properties of liquid egg such as, for example, foaming ability, pourability, and emulsification properties.

The combination of electroheating the liquid egg by applying mains frequency current in mains frequency electroheating unit 391 and applying high voltage pulses to the liquid egg is pulsing cells 318, 319 is thought to be particularly useful at killing spoilage bacteria. The short time duration pulses are thought to be effective at killing spoilage bacteria which are able to survive the lower voltage, mains frequency treatment. It is also believed that the stress of repeated heating and cooling stages is detrimental to spoilage bacteria.

Liquid egg produced in accordance with the third preferred embodiment of the present invention provides all the advantages of shelf-stable liquid egg which were described above in reference to the first and second preferred embodiments. As in the first and second preferred embodiments, the need for costly refrigeration equipment is eliminated.

A preferred embodiment of mains frequency electroheating unit 391 is now described in detail in reference to FIGS. 9–12. A good description of the use of mains frequency to electroheat liquid egg is given in U.S. patent application Ser. No. 08/125,933 of David Reznik, which is hereby incorporated by reference herein.

Mains frequency electroheating cell 391 preferably includes a generally rectangular housing 361 having a food product inlet 362 and a food product outlet 363. All of the internal surfaces of mains frequency electroheating cell 391 and housing 361 are composed of, or coated with, an electrically insulating non-metallic material 364 such as, for example, porcelain, plastic, glass or ceramic. It is important that the food not come in direct contact with any metal surface in mains frequency electroheating cell 391.

Housing 361 also preferably includes at least a first aperture 365 and a second aperture 366 through which electrode assemblies may be inserted into the interior of mains frequency electroheating cell 391. The construction of the electrode assemblies are described in greater detail below. Briefly, an electrode assembly includes an electrode, a barrier which prevents food from directly contacting the electrode and an electrolyte-filled gap disposed therebetween.

Figure 9:
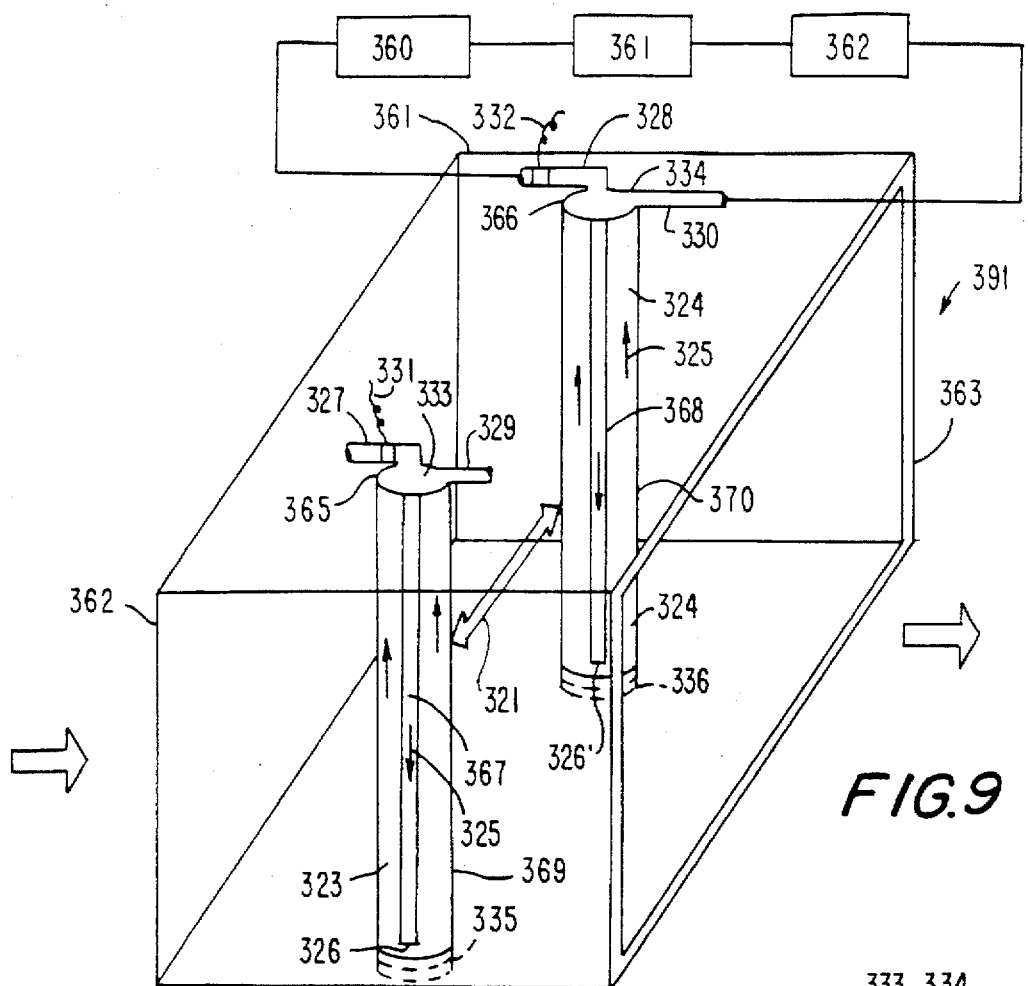
FIG. 9 is a perspective diagrammatic view of a preferred embodiment of the mains frequency electroheating unit of FIG. 8.

Apertures 365 and 366 preferably are disposed in the same wall of housing 361 as shown in FIG. 9. Of course, they need not be so disposed and other arrangements are also contemplated. A first electrode assembly including electrode 367 is inserted into the interior of mains frequency electroheating cell 391 through first aperture 365 and a second electrode assembly including electrode 368 is inserted into the interior of mains frequency electroheating cell 391 through second aperture 366. The location of apertures 365 and 366 is not important so long as they are spaced relative to one another such that a suitably sized heating zone 321, as described below, is formed between the electrodes in housing 361. A plurality of pairs of electrode assemblies can be placed into a single mains frequency electroheating cell 391, or several cells 391 utilizing one or more pairs of electrode assemblies can be formed.

It is also contemplated that mains frequency electroheating Cell 391 can have any cross-sectional shape such as generally round, square, oval, etc. (e.g., a hollow pipe or cylinder).

Again, as illustrated in FIG. 9, first aperture 365 and second aperture 366 preferably are provided to allow for the respective insertion of the first electrode 367 and second electrode 368, along with their associated assemblies as described herein into the interior of mains frequency electroheating cell 391. The electrode assemblies 367 and 368 preferably are mounted within a respective aperture 365, 366 such that a liquid-, air-, and bacteria-proof seal is formed.

Figure 10:
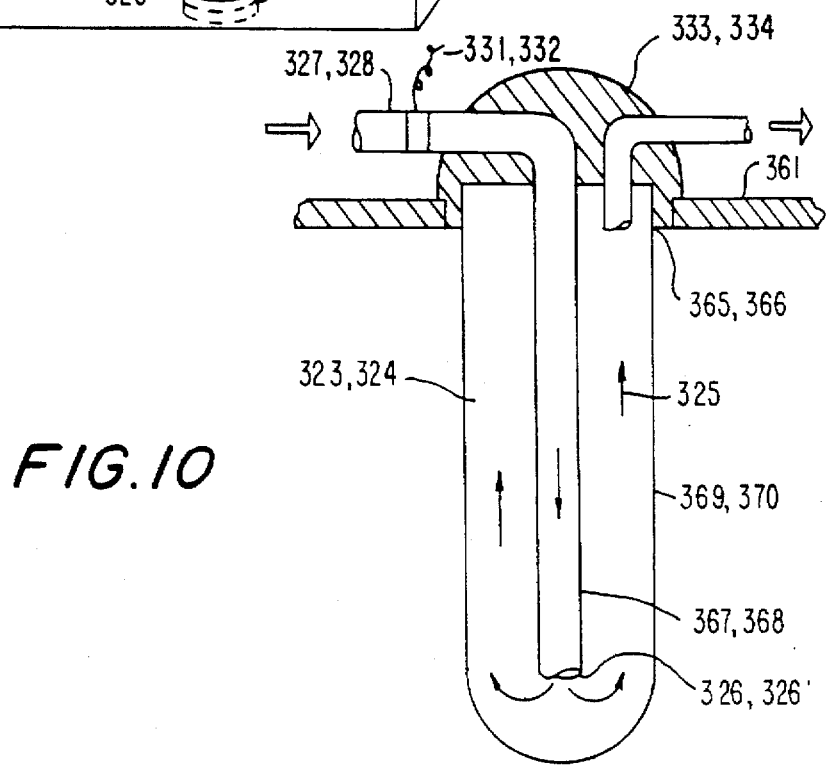
FIG. 10 is a partial cross-sectional side view of an electrode assembly of FIG. 9.

First electrode 367 and second electrode 368 are preferably open ended hollow cylindrical tubes of conductive metals which are not intended to come into direct intimate contact with the food product. To accomplish this objective, a pair of hollow cylindrical test tube like barriers 369 and 370 having a closed generally hemispheric bottom preferably are provided which, as illustrated in FIGS. 9 and 10, substantially completely envelope the electrodes. The distance between the first barrier 369 and the second barrier 370 is referred to as the food product heating zone 321. It preferably is in this general area that most of the electroheating takes place in mains frequency electroheating cell 391. When the electrodes 367 and 368 and their related structure, as illustrated in FIG. 9, are used in a single pair, it is best to locate them so as to maximize heating zone 321 and minimize the distance between the surrounding barriers 369 and 370 and the adjacent walls of the housing 361. This minimizes the "dead space" through which the food product can travel without being subject to the heating zone 21. Alternatively, a wall or blockage could be constructed to divert the flow directly into heating zone 21.

Figure 11:
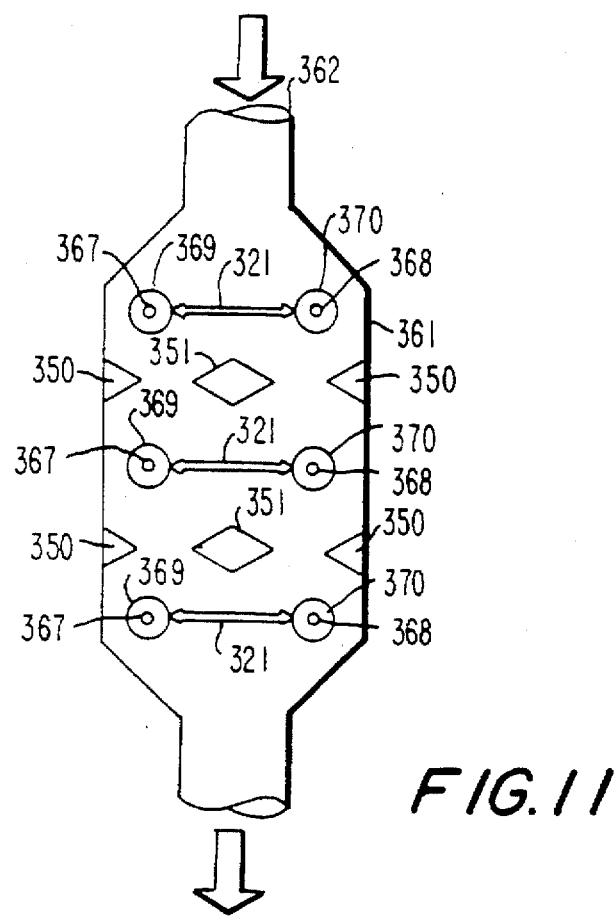
FIG. 11 is a top plan view, in cross-section, of a mains frequency electroheating unit including a plurality of electrode pairs and flow diverters.

As shown in FIG. 11, it is also possible to use a plurality of pairs of electrodes. In such cases, flow diverters 350 and 351 can be positioned throughout the housing to ensure that all of the food product being treated flows through at least one heating zone 21 formed between at least one pair of electrodes. Preferably, the food product will be diverted into a plurality of such heating zones 321. Of course, if plate electrodes and plate shaped barriers are used, there will be no need for either walls or diverters 350, 351.

The exterior surface of electrodes 367 and 368 and the interior surface of the barriers 369 and 370, respectively, are maintained separated from one another to prevent their intimate contact by an annular separation gap 323 and 324 therebetween, each containing an electrolyte solution 325. In the embodiment illustrated in FIGS. 9 and 10, electrodes 367 and 369 are maintained at a substantially constant defined distance from the barriers 369 and 370 by mounting the electrodes in respective first and second plugs 333 and 334. The plugs 333 and 334 are inserted into the top opening of the generally test tube shaped barriers 369 and 370 so as to form a closed system. In this regard, the plugs 333 and 334 are secured within the apertures 365 and 366 and within the open end of the generally test-tube shaped barriers 369 and 370 such that the previously noted seal is provided.. The plugs 333 and 334 are generally made of a heat resistant plastic such as nylon. Of course, other non-conductive materials may also be used.

The plugs 333 and 334 have respective electrolyte inlets 327 and 328 through which electrolyte solution 325 is introduced into the interior of each electrode 367 and 368 and its associated structure. The flow of electrolyte solution 325 through the electrode assembly is illustrated by the arrows. Specifically, electrolyte solution 325 flows into the interior of electrodes 367 and 368 through respective electrolyte inlet 327 and 328. Electrolyte solution 325 then flows through the entire length of the electrodes 367 and 368 where it exits at the open end 326 and 321 thereof. Thereafter, electrolyte solution 325 flows back along the outer surface of electrodes 367 and 368 filling the annular separation gaps 323 and 324. Plugs 333 and 334 are designed to each accommodate at least one electrolyte outlet, such as respective electrolyte outlets 29 and 330. Electrolyte solution 325 exiting through one of the electrolyte outlets 329 and 330 can be processed to remove the products of electrolysis and also to cool the electrolyte solution before it is returned to a reservoir 60 for re-introduction through the electrolyte inlets 327 or 328. As shown in FIG. 9, this can be accomplished by use of circulating pump 362, and a cooling unit 361 as is conventional. Of course, the cooling and removal of products of electrolysis can also take place just prior to reintroducing the electrolyte to an electrode. In addition, the electrolyte exiting through an electrolyte outlet in one electrode can be reintroduced into one or more successive electrodes before being recycled.

The electrolyte inlets are often made of a conductive material in electrical connection with the electrodes. The electrolyte inlets in such cases may serve as the point of connection to the source of electrical energy. See, for example, FIG. 9 wherein electrodes 367 and 368 are connected to a source of alternating electrical energy (not shown). This is accomplished through respective power cable and coupling means 331 and 332 attached to electrolyte inlets 327 and 328 respectively.

To ensure equal exposure of food product in mains frequency electroheating cell 391 to the current passing between electrodes 367 and 368, i.e., crossing through heating zone 21, the generally rounded closed end portions of the barriers 369 and 370 may be disposed in a respective recess 335 and 336 provided in the bottom wall of the housing 361. These recesses 335 and 336 support the lower end of the electrodes and their associated barriers.

It should be understood that the exact structure of mains frequency electroheating cell 391 need not be as just described. This structure and arrangement is one embodiment of mains frequency electroheating cell 391. It is only required that at least one pair of electrodes 367 and 368 be provided and that each electrode be protected from intimate contact with the food product being treated by a highly conductive barrier. The shape of the electrodes 367 and 368 is also not essential to the present invention. For example, electrodes may be flat plate electrodes, solid rods of round or other cross section, or could have a coiled shape.

Figure 12:
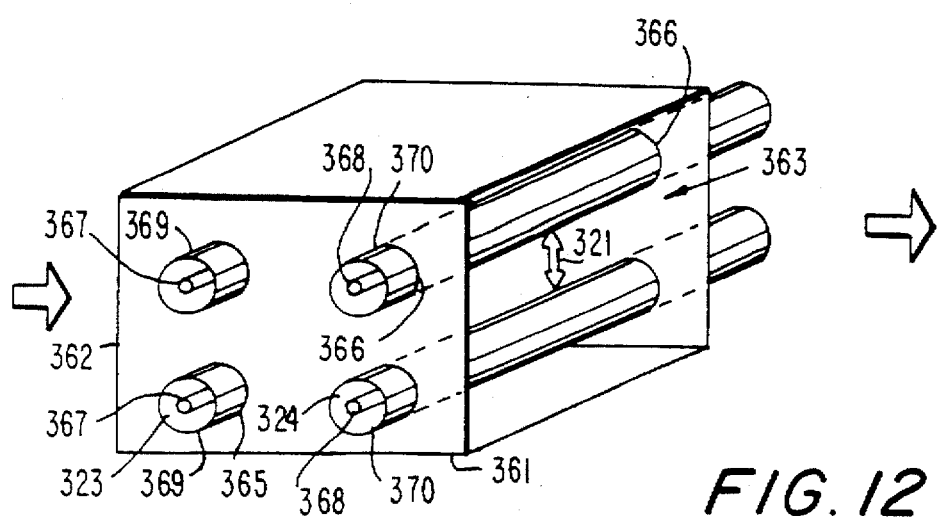
FIG. 12 is a side elevational view, in partial perspective, of an alternate configuration of the mains frequency electroheating unit having a solid rod electrode and a hollow tube shaped barrier open at both ends.

As illustrated in FIG. 12, barriers 369 and 370 can be completely cylindrical having two open ends, the cylinder bridging across the interior of the housing 361. A rod shaped electrode having a solid cross-section can then be inserted into the interior of the cylindrical barriers through one of the circular open ends and spaced apart therefrom. Electrolyte solution 325 can traverse the housing through the gap created between the electrodes 367 and 368 and the barriers 369 and 370 respectively by entering through one of the open ends of the cylindrical barrier and exiting out of the other on the other side of housing 361.

As previously noted, at least one pair of electrodes 367 and 368 must be provided. Successive opposed pairs of electrodes having the same or different configuration can also be used.

The electrodes 367 and 368 can be manufactured from a variety of conductive metals such as steel or copper. Preferably, the electrodes 367 and 368 are manufactured from materials which will not dissolve because of electrolysis. At certain frequencies such as, for example, household or mains frequency (60 Hz in the U.S.A. and 50 Hz in Europe), the problem of electrolysis is particularly acute. Metals such as gold, carbon, platinum, and titanium alloys do not dissolve under such conditions. It is therefore possible to create electrodes 367 and 368 entirely from these materials to avoid this problem. It is noted that titanium may slowly corrode. However, it forms insoluble titanium oxide which can be filtered as described in the aforementioned U.S. patent application Ser. No. 08/125,933.

Alternatively, the electrodes 367 and 368 can be made from, for example, a core of a highly conductive metal such as copper. The core is then coated with a stable rare metal such as platinum, gold or titanium. A coating of from between about 10 to about 50 microns in thickness is adequate.

As previously discussed, the use of stable rare metals as the electrodes 367 and 368 will reduce or eliminate the electrolysis-based dissolution of the electrodes. Nonetheless, at frequencies of under 100 kHz and, more particularly, under 100 Hz, the process of electrolysis can still cause the creation of hydrogen, chlorine, and oxygen. These elements, in their atomic forms, are very active as reducers and oxidizers. These species, and otherwise reactive species, persist even if electrodes 367 and 368 are made of, for example, gold. To ensure that these reactive species do not adversely affect the food product being electroheated, the barriers 369 and 370 are provided containing the electrolyte solution 325 so that this form of electrolysis can take place in the electrolyte solution 325 instead of within the food product. If a dissolvable metal electrode is used, then the electrolyte solution 325 receives the dissolving metal and the barriers 369 and 370 ensure that neither the dissolved metal species nor the gases or other species generated can affect the treated food product. Similarly, it is very important to ensure that the food being treated is not placed in direct contact with any metal surface within mains frequency electroheating cell 391. Even if dissolution of the cell itself could be avoided by use of precious metals such as gold, there still remains the need to avoid the other adverse consequences of electrolysis. This is accomplished by preferably coating cell 391 or alternatively constructing cell 391 from inert, insoluble, non-conductive materials such as porcelain, ceramic, glass and the like.

The barriers 369 and 370 can be made of a variety of materials. However, a number of variables must be considered in the material selection. First, the barriers 369 and 370 must have a high capacity for the electrolyte solution 325 such that they can have a very high conductivity/low resistivity. Absent the electrolyte solution, the material used to construct the barriers 369 and 370 is generally insulative. Preferably, the conductivity of the barriers 369 and 370 including the electrolyte solution will be identical to that of the electrolyte solution per se.

Second, the barriers 369 and 370 must promote a high degree of conductive stability by retain the electrolyte solution. If the electrolyte solution is not retained, then, at least in localized areas, the resistivity of the barriers 369 and 370 will increase and the efficiency of the electrical transfer will decrease. More importantly, however, the increase in resistance is generally accompanied by an increase in conversion of electric current to heat. As the barriers 369 and 370 heat up in localized areas, the barriers may dry out and the cycle of lower efficiency and increased conversion of energy to heat accelerates. Conductive stability can be achieved by the use of thin barrier walls which minimize the chance of any portion of the barriers 370 drying out.

In addition, the conductive stability of the barriers 369 and 370 can be further improved by dissipating heat which may be built up within the system. In particular, the outer surface of the barriers tend to get hot because of their contact with the heated food. Heat dissipation is preferably achieved by recirculating and cooling the electrolyte solution by conventional pumping and cooling devices as previously described.

The barriers 369 and 370 should also have sufficient porosity to ensure that there is a flow of electrolyte solution into the barriers. This will help ensure that the barriers 369 and 370 remain fully wetted and assist in heat dissipation.

The barriers 369 and 370 should have a high degree of mechanical stability. For example, the barriers 369 and 370 are to withstand a pressure differential. In accordance with one embodiment of the present invention, the electrolyte solution is maintained under a higher positive pressure than that of the food product being treated. This ensures that the electrolyte solution has good penetration into the barriers 369 and 370 while, at the same time, discouraging the impregnation of the barriers with the food product being treated. The impregnation of the barriers 369 and 370 with the food product may increase the localized resistance of the barriers 369 and 370, thereby increasing the conversion of energy to heat and promote the drying out of the barriers. Positive pressure reduces these problems, but creates its own physical stress. Thus, the barriers should be able to withstand both the increased pressures applied and the pressure gradient formed across the barrier. The barriers should also be able to withstand long term elevated temperatures, a temperature differential across the barrier, and prolonged passage of continuous electrical energy therethrough.

The material used for the barriers 369 and 370 should be inert and insoluble in both the food product and the electrolyte solution. The barriers 369 and 370 also should not include metal or other electron conducting components as these components may be subject to electrolysis when placed in the electric field emanating between the electrodes 367 and 368.

More specifically, the barriers 369 and 370 requires having the correct porosity. The barrier must be porous enough to allow sufficient electrolyte solution in, without being porous enough to allow for significant leakage of electrolyte solution into the food product or the penetration of the barriers by the food product being treated. Generally, the porosity of the barrier material is maintained somewhat lower than would otherwise be selected because of the use of acting upon the electrolyte solution. This aids the forced permeation of the barriers 369 and 370 with electrolyte solution and, at the same time, resists the seepage of electrolyte solution into the food product and the permeation of the barriers by the food product being treated. Suitable ceramic material for the contraction of the barriers 369 and 370 can be obtained from Coors Ceramic Company of Golden, Colo.

Ceramic manufacturers use a number of standards to measure porosity. These standards are not always comparable and variability in ceramic porosity is an industry wide problem. Therefore, in the context of the present invention, porosity should be practically defined in terms of the number of cubic centimeters of water which can pass through 1 square centimeter of a ceramic barrier material in 1 hour with a 1 psi pressure differential (i.e., the number of $cm^3/cm^2/hr/psi$) across the material. The porosity of the barrier should be selected to ensure that undesirable levels of leakage of the electrolyte solution into the food being treated is avoided. In some instances, this will mean minimizing the porosity of the barrier material. However, for other products such as those to which salt will intentionally be added, the porosity of the barrier material can be selected to deliver the necessary amount of salt to the product. Generally, the minimum porosity should be about $5.0 \times 10^{-2}$ $cm^3/cm^2/hr/psi$. The maximum porosity should be about 5.0 $cm^3/cm^2/hr/psi$. For most circumstances, a porosity of about 0.3 $cm^3/cm^2/hr/psi$ has been found to be useful.

In general, the thickness of the barriers 369 and 370 should be about ⅛" (about 3.2 mm) or less and preferably, about 1/16" (about 1.6 mm). When certain ceramic barriers of ¼" (about 6.4 mm) thickness were used, particularly when the barrier is in the form of a flat plate, drying out of the barrier occurred. On the other hand, if a barrier thickness of 1/16" (about 1.6 mm) or less is used (i.e., 1/32" (about 0.8 mm)), it may be necessary that the barriers 369 and 370 be structurally reinforced, particularly if the barriers are constructed in the form of a flat sheet.

Additional strength and dimensional stability can be provided by the use of barriers 369 and 370 which are cylindrical or test tube in shape as illustrated in FIGS. 9 and 10. The additional stability and strength of such structure allows for the use of generally thinner barriers.

While porous ceramic material is preferred in accordance with the present invention, other porous materials may also be used such as porous glass, cloth, such as used in the construction of fire hoses, and the like.

As previously described, the electrodes and the barriers are separated by a gap 323 which can be of any size. However, the larger the gap, the greater the overall resistance of the electrode system. It is desirable to keep the resistivity of the electrolyte solution and barrier combination, and in fact the electrode itself, to as little as possible. This will minimize the heat loss to the electrolyte and maximize the energy transferred to the food product. Preferably, the combination of the barrier and electrolyte solution contribute 5% or less to the total resistivity of the electrode system in operation. Put another way, the combined resistance of the electrolyte solution and barrier should be 5% or less of the total resistance of the combination of the electrolyte solution, the barrier and the food product being treated. Most preferably, the resistance of the electrolyte solution and barrier is 1% or less of the total resistance of the electrode system. Therefore, the gap between the barrier and the electrode is generally minimal and is preferably the same as the thickness as the barrier itself.

Any electrolyte solution which is biocompatible and which, in rather large amounts (1000 ppm or less) does not significantly effect the organoleptic qualities of the food product being treated can be used in accordance with the present invention. For example, sodium chloride may be used. The concentration of the electrolyte solution depends on the particular electrolyte solution used.

It is known that the conductivity of an electrolyte solution may increase and/or decrease as a function of concentration. AS concentration of the electrolyte solution increases, so too does the conductivity, up to a point. Thereafter, increases in concentration may actually decrease the conductivity. Preferably, the concentration which will provide maximum conductivity for a given electrolyte solution is used. Potassium chloride is particularly useful in accordance with the present invention because a 30% solution can be used with maximum conductivity profiles. This high concentration ensures high conductivity. In addition, potassium chloride is particularly desirable since both the potassium and chloride ions have approximately the same electrical transfer rate. This ensures that the number of positive and negative ions available at any one time stays roughly constant and roughly equal. Sodium chloride may also be used, however, its maximum conductivity is not as high as that of potassium chloride. Solutions of calcium chloride, potassium sulfate, sodium sulfate and other conventional electrolytes may also be used.

As previously described, it may be advantageous to maintain the electrolyte under positive pressure. This can be accomplished by use of a positive pressure pump (not shown) to recirculate the electrolyte solution. The electrolyte is also preferably maintained at a temperature which is below the temperature of the food being treated. Therefore, preferably, the electrolyte is cooled to a temperature of between about 1° C. and about 10° C. below the temperature of the food being treated.

Potassium chloride is particularly bitter tasting. However, with a barrier of ceramic having a porosity equivalent to seepage of $3.3 \times 10^{-3}$ $cm^3/cm^2/hr/psi$, only about three parts per million of the electrolyte traverses the barrier and enters the liquid food product. This is based on a food product flow rate of 25,000 lbs./hr. (11,364 kg/hr). It may also be advantageous to add a gelling agent to the electrolyte solution. The formation of a weak gel will further retard the seepage of electrolyte into the food product. For example, 0.1% to 0.5% weight of alginate will form a gel which is high enough in viscosity to assist as a seepage retardant. However, the resulting electrolyte is not so viscous that it cannot "wet" the barrier or be pumped.

As the mains frequency electroheating cell 391 is utilized, some of the electrolyte solution will be depleted either through seepage into the food product being treated or electrolytic decomposition of water. It is important that the various electrolyte levels be monitored and their levels adjusted by the addition of additional electrolyte as needed. In addition, it is necessary that the gases formed within the electrolyte solution be vented and removed from the electrolyte solution.

The energy utilized in accordance with the present invention is alternating current. The alternating current has a continuous sinusoidal wave form and, most preferably, includes both a positive and a negative component. Preferably, the waves are symmetrical and have an equal positive and negative component. The frequency of the electrical energy used can range from about 30 Hz up to about 99 kHz, but is preferably between about 50 Hz up to about 99 kHz, but is more preferably between about 50 Hz and about 10 kHz, particularly in the United States. Most preferably, the frequency is between about 50 Hz and about 99 Hz.

In addition, it is preferred that the voltage utilized in accordance with the present invention range from between about 50 volts to about 500 volts and that the current range from between abut, 50 amps to about 500 amps. Preferably, the current should be limited to about 300 amps. This can be accomplished by adjusting the size of heating zone 321 between the pairs of barriers 369 and 370 and by controlling the voltage. Of course, these are the total currents. Typical current densities are generally lower than about 4 amps/cm$^2$ and more preferably, lower than about 1 amp/cm$^2$.

Thus, a third preferred embodiment of the present invention has been described with reference to FIGS. 8–12. Liquid egg treated in accordance with this embodiment has a shelf life of at least 5 days when stored at about 70° F. (about 21° C.). More preferably, the liquid egg has a shelf life of at least 7 days when stored at about 70° F. (about 21° C.).

In accordance with the present invention, liquid egg can be treated using high frequency alternating electric current, mains frequency alternating electric current, and high voltage electric pulses in two-stage or three-stage combinations other than those described above. For example, shelf-stable liquid egg can be produced by applying a plurality of high voltage electric pulses, cooling the liquid egg, and then applying mains frequency alternating electric current. As another example, shelf-stable liquid egg can be produced by applying high frequency alternating electric current, cooling the liquid egg, and then applying mains frequency alternating electric current. Other combinations can also be used.

In general, shelf-stable liquid egg is produced in accordance with the present invention by first heating the liquid egg to a temperature of at least about 140° F. (about 60° C.) using a method selected from the group consisting of electroheating the liquid egg using high frequency alternating electric current, electroheating the liquid egg using mains frequency alternating electric current, and applying a plurality of high voltage electric pulses. The liquid egg is then cooled to a temperature below about 140° F. (about 60° C.). The liquid egg is then again heated to a temperature of at least about 140° F. (about 60° C.) using a method selected from the group consisting of electroheating the liquid egg using high frequency alternating electric current, electroheating the liquid egg using mains frequency alternating electric current, and applying a plurality of high voltage electric pulses.

Preferably, the liquid egg is then again cooled to a temperature below about 140° F. (about 60° C.), and then again heated to a temperature of at least about 140° F. (about 60° C.) using a method selected from the group consisting of electroheating the liquid egg using high frequency alternating electric current, electroheating the liquid egg using mains frequency alternating electric current, and applying a plurality of high voltage electric pulses. It is preferable, but not necessary, to perform this third heating step to produce shelf-stable liquid egg.

Liquid egg treated in accordance with the methods described herein is shelf-stable. The liquid egg has a shelf life of at least 5 days when stored at about 70° F. (about 21° C.). More preferably, the liquid egg has a shelf life of at least 7 days when stored at about 70° F. (about 21° C.).

Thus, methods of and apparatus for producing shelf-stable liquid egg have been described. Those skilled in the art will appreciate that various modifications can be made to the embodiments of the present invention described herein without departing from the spirit or scope of the invention, and that the invention is limited only by the claims which follow.

What is claimed is:

1. A shelf-stable liquid egg product, produced in accordance with a method comprising the steps, in the sequence set forth, of:

providing liquid egg;

preheating said liquid egg to a temperature of at least about 110° F.;

heating said liquid egg a first time to a temperature of at least about 140° F. using a method selected from the group consisting of electroheating said liquid egg using high frequency alternating electric current, electroheating said liquid egg using mains frequency alternating electric current, and applying a plurality of high voltage electric pulses to said liquid egg;

cooling said liquid egg to a temperature below about 140° F.;

heating said liquid egg a second time to a temperature of at least about 140° F. using a method selected from the group consisting of electroheating said liquid egg using high frequency alternating electric current, electroheating said liquid egg using mains frequency alternating electric current, and applying a plurality of high voltage electric pulses to said liquid egg;

holding said liquid egg for a predetermined period of time at a temperature of least about 140° F. so that said liquid egg is at least pasteurized; and aseptically packaging said liquid egg, wherein said liquid egg is shelf-stable for at least 5 days when stored at about 70° F., said liquid egg substantially retaining foaming ability, pourability, and emulsification properties of unpasteurized liquid egg without detrimental coagulation.

2. The shelf-stable liquid product of claim 1, wherein said product has a shelf life of at least 7 days when stored at about 70° F.

3. The shelf-stable liquid egg product of claim 1, wherein said product is produced by electroheating said shelf-stable liquid egg product to a temperature of at least about 140° F.

* * * * *

UNITED STATES PATENT AND TRADEMARK OFFICE
CERTIFICATE OF CORRECTION

PATENT NO. : 5,741,539
DATED : April 21, 1998
INVENTOR(S) : Knipper, et al.

It is certified that error appears in the above-identified patent and that said Letters Patent is hereby corrected as shown below:

On the title page:

Page 2, at [56] References Cited, under FOREIGN PATENT DOCUMENTS, "WO 8900384" should be
-- WO 89/00384 --.
Page 2, at [56] References Cited, under FOREIGN PATENT DOCUMENTS, "WO 9015547" should be
-- WO 90/15547 --.
Page 2, at [56] References Cited, under FOREIGN PATENT DOCUMENTS, "WO9319620" should be
-- WO 93/19620 --.
Page 2, at [56] References Cited, under OTHER PUBLICATIONS, in the "Annual Report ..." document, "Products" should be -- Projects --.
Page 2, at [56] References Cited, under OTHER PUBLICATIONS, in the second Hamid-Samimi document, "Egg." should be -- Egg, --.
Page 2, at [56] References Cited, under OTHER PUBLICATIONS, in the third Palaniappan document, "presentation" should be -- Presentation -- and "12-12-15" should be -- 12-15 --.
Page 2, at [56] References Cited, under OTHER PUBLICATIONS, in the first Parrott document, "1'" should be -- 1" --.
Page 2, at [56] References Cited, under OTHER PUBLICATIONS, in the second Sastry document, "S.K." should be -- S.K. et al. --.
Column 2, line 23, "equal" should be
-- equal to --.
Column 2, line 35, "Savings" should be
-- savings --.

UNITED STATES PATENT AND TRADEMARK OFFICE
CERTIFICATE OF CORRECTION

PATENT NO. : 5,741,539
DATED : April 21, 1998
INVENTOR(S) : Knipper, et al.

It is certified that error appears in the above-indentified patent and that said Letters Patent is hereby corrected as shown below:

Column 2, line 66, "60°C.)." should be
-- 60°C.) --.
Column 4, line 9, "cross-section" should be
-- cross section --.
Column 5, line 7, "ion" should be
-- ions --.
Column 6, line 53, "order" should be
-- order to --.
Column 9, line 12, "about." should be -- about --.
Column 11, line 56, "order" should be
-- order to --.
Column 12, line 25, delete "is".
Column 16, line 11, "to-a" should be -- to a --
and "concentric-electrode" should be
-- concentric electrode --.
Column 16, line 13, "electrode-containing" should
be -- electrode containing --.
Column 16, line 17, "electrode-" should be
-- electrode --.
Column 17, line 21, "4°C.," should be
-- 4°C.), --.
Column 18, line 20, "60°C." should be
-- 60°C.), --.
Column 19, line 3, "order" should be
-- order to --.
Column 22, line 4, "order" should be
-- order to --.
Column 22, line 28, "egg is" should be
-- egg in --.

UNITED STATES PATENT AND TRADEMARK OFFICE
CERTIFICATE OF CORRECTION

PATENT NO. : 5,741,539
DATED : April 21, 1998
INVENTOR(S) : Knipper, et al.

It is certified that error appears in the above-identified patent and that said Letters Patent is hereby corrected as shown below:

```
Column 23, line 16, "Cell" should be -- cell --.
Column 24, line 4, "test-tube" should be
-- test tube --.
Column 24, line 16, "inlet" should be
-- inlets --.
Column 24, line 28, "re-introduction" should be
-- reintroduction --.
Column 25, line 2, "cross-section" should be
-- cross section --.
Column 26, line 7, "retain" should be
-- retaining --.
Column 26, line 59, "requires" should be
-- require --.
Column 27, line 66, "thickness as" should be
-- thickness of --.
Column 28, line 10, "AS" should be -- As --.
Column 29, line 8, "abut," should be -- about --.
```

Signed and Sealed this

Tenth Day of October, 2000

Attest:

Attesting Officer

Q. TODD DICKINSON

Director of Patents and Trademarks